United States Patent [19]

Olson et al.

[11] Patent Number: 5,566,333

[45] Date of Patent: Oct. 15, 1996

[54] RELATIONAL DATABASE INFORMATION MANAGEMENT SYSTEM FOR FACILITATING NORMALIZATION OF A RELATIONAL DATABASE

[75] Inventors: Michael J. Olson, Syracuse; David Reibert, Clay; Stanley A. Slow, Liverpool, all of N.Y.

[73] Assignee: Trace Technologies, Inc., Fayetteville, N.Y.

[21] Appl. No.: 972,230

[22] Filed: Nov. 5, 1992

[51] Int. Cl.$^6$ .................................................. G06F 17/30
[52] U.S. Cl. .................. 395/600; 364/974.1; 364/974.3; 364/963.3; 364/282.1; 364/283.1; 364/283.4; 364/283.3; 364/DIG. 1
[58] Field of Search .............................................. 395/600

[56] References Cited

U.S. PATENT DOCUMENTS

| | | | |
|---|---|---|---|
| 4,648,044 | 3/1987 | Hardy et al. | 395/76 |
| 4,658,370 | 4/1987 | Erman et al. | 395/76 |
| 4,894,771 | 1/1990 | Kunii et al. | 395/600 |
| 5,056,003 | 10/1991 | Hammer et al. | 395/650 |
| 5,201,047 | 4/1993 | Maki et al. | 395/600 |
| 5,303,367 | 3/1994 | Leenstra, Sr. et al. | 395/600 |
| 5,307,484 | 4/1994 | Baker et al. | 395/600 |
| 5,315,709 | 5/1994 | Alston, Jr. et al. | 395/600 |

Primary Examiner—Thomas G. Black
Assistant Examiner—Peter Y. Wang
Attorney, Agent, or Firm—Harris Beach & Wilcox

[57] ABSTRACT

A computer system that incorporates an SQL type relational database is adapted to enterprises in which human performance is to be managed. There is a single table that contains linking information for multiple entity relationships among a plurality of information entities. Programs that cooperate with the database kernel include an entity relation manager for modifying the linker table to dynamically define entity relationships among the information entities; a hierarchal structure manager for dynamically defining hierarchal relationships among objects in the information entities; a load/unload utility, for changing information between a human-readable format and another format having a syntax acceptable to the database kernel; and an editor which provides an environment that enables a human operator to conveniently interact with the relational database.

7 Claims, 1 Drawing Sheet

RELATIONAL DATABASE INFORMATION MANAGEMENT SYSTEM FOR FACILITATING NORMALIZATION OF A RELATIONAL DATABASE

BACKGROUND OF THE INVENTION

1. Field of the Invention

This invention relates to an information management system that enables a user to manage an enterprise of the type requiring specified predetermined levels of human performance of tasks in a complex environment. In particular it relates to an information management system having improved capabilities for controlling a relational data base.

2. Description of the Prior Art

Managing complex enterprises involving complex environments, critical tasks, and complicated man-machine interfaces generally requires that a specified level of human performance of multiple, complex, often interrelated tasks be guaranteed. Optimum management implies that this be done at minimum cost. Examples of enterprises suitable for employment of the present invention include nuclear power plants, refineries, aircraft, banks, and insurance. As used herein, "enterprise" embraces the total activities regarding a project, from design through operation as regards human performance issues. The costs of an enterprise include:

(1) development of a requirements model for training, including task analysis, determination of criticality factors, and systems analysis;

(2) specification and updating of man-machine interfaces;

(3) development and maintenance of training curricula and materials, technical manuals, instruction books, and other job performance aids;

(4) evaluation, training, and qualification of personnel; and (5) evaluation, updating, and maintaining of the enterprise itself in matters of human performance.

Large amounts of information are needed to develop and manage a complex enterprise. It is well known to store information in computer database systems. Relational databases are particularly useful in handling and correlating different categories of information. Modern relational databases include query languages, known as 4th generation languages (4GL), with which a user can use the computer system in an interactive mode that approximates the syntax of natural language. Standard query language (SQL) is an example.

Conventional relational database systems are based on tables (information entities). Each entity consists of related attributes in a predetermined format. An executing program extracts information from at least one, and generally more than one information entity table, and presents it in a coherent manner to the user. In order for the program to search for desired information in the entity tables, the tables must be related to one another by links, or relational keys, a process known as normalization. As is well known in the art, normalization theory is based on the observation that a certain set of relations has better properties in an updating environment than do other sets of relations containing the same data. Special linking tables are used when multiple instances of one entity are related to multiple instances of related entities, i.e. "many-to-many". As the number of related information entities in a database increases, the system of linking tables becomes complex and increasingly difficult to update and manage. These tables are static in a given state of the relational database, and require the intervention of a skilled database technician or administrator to modify. Incorrect adjustment of the linking tables could cause data to become inaccessible and the user could be misinformed. In the case of the enterprises contemplated by the present invention, there may be hundreds or thousands of different information entities, whose relationships to one another could be fluid during the development of the enterprise.

Vendors of relational databases provide utilities and tools for the generation of reports that contain information for the user. The development of such reports may require a coded program containing complicated statements in a syntax in accordance with the relational database definition, such as SQL statements. In the case of the information relating to the above-described enterprises, changes in the relational keys can affect the integrity of the report program. The tools known to the inventors for maintaining consistency in different aspects of the database are difficult to use.

Data entry constitutes a major limitation with standard relational databases. Most user interfaces are designed for transactional processing, an example being the depositing or withdrawing of funds at an automated banking machine. When the conventional transactional user interface is applied to applications which have data sets with large number of parameters, and where some of the parameters are blocks of discursive text, the efficiency of the data entry task can deteriorate to unacceptable levels.

Another shortcoming in conventional relational databases is the modeling of entity relationships. The processes affecting conventional entity relationships include sequencing, pointing, key inclusion, and querying. None of these can efficiently deal with tree structured hierarchal relationships, such as a high order binary tree.

SUMMARY OF THE INVENTION

It is therefore a primary object of the present invention to provide an improved system for managing information that enables a manager to economically attain a specified level of human performance in a complex enterprise.

It is another object of the invention to provide an improved method for relating information entities in a relational database.

It is yet another object of the invention to reduce table overhead in a relational database.

It is still another object of the invention to provide an improved user interface for modifying a relational database and generating reports therefrom.

It is a further object of the present invention to provide improved processing of hierarchal structures.

It is a still further object of the present invention to provide an improved method of defining enterprise parameters, standards, and values.

These and other objects of the present invention are attained by a computer system that incorporates an SQL type relational database therein that is adapted to enterprises in which human performance is to be managed. The invention is practiced in several phases in conjunction with a computer system.

Initial modeling. In a preparatory phase an enterprise having human performance factors to manage is modeled and described in the database by defining its domain, rules, information entities, functional analyses, syntheses, and their sequences. Parameters applying to the information entities are also defined, and ranges of their allowable values are specified. An adequate description of the enterprise typically requires a variety of other kinds of information to be stored, such as enterprise responsibilities, and the identification and qualification of information sources.

Importantly, the criteria for each human activity to be evaluated by the enterprise manager are specified. Each job is listed, together with various hardware, software, and abstract systems entailed by the job. Man-machine interfaces and both active and passive aspects of the man-machine interfaces must be described and taken into consideration.

As the model of the enterprise develops, operations analyses are conducted, and the job functions modeled as hierarchal task structures. Hierarchal logical and physical models of the systems involved in the job are synthesized and their elements correlated. It is an aspect of the invention that hierarchal relationships can be dynamically defined and integrated into the operation of a conventional relational data base. Operations included in each job are identified, correlated to specific task functions, and decomposed into discrete actions, or defined as a decision with related criteria.

Complete definition of the enterprise further requires that the purpose and physical locations of all elements be specified. The range of manipulations of active elements, and range of indications and significances of passive elements are set forth.

In yet another stage of the modeling phase, task and skill analyses are conducted, and task criticalities assessed. This is accomplished by selecting an analysis subset from the set of tasks comprising a target job. The standards of job performance are specified; conditions affecting performance are identified; job performance aids are listed, along with administrative matters such as the evaluation interval, methodology, criteria, and the range of media required to evaluate task performance are placed in the data base.

During this phase, adjunctive to task evaluation, population performance analyses may be conducted, in which the ranges of past experience, and the current qualifications of target populations are input into the database. The predicted and/or measured performance of the populations are specified for the task analysis subset in terms of difficulties encountered. Such matters as deviations from task performance standards and the time taken to achieve the standards may be included in the population analysis.

Training analysis. In general initial and ongoing training is an important aspect of human performance optimization. Initially a training requirements analysis is conducted, taking into consideration the instructional methods and media suitable for facilitating the specified performance standards. The requisite skills and knowledge are specified as lesson elements leading to their development. Lesson elements are compiled into curricula. Optimum media are selected from the above specified evaluation, test, and instructional media ranges. Lesson elements, tests, and evaluations are sequenced and organized into hierarchal learning structures to form syllabi.

The data and results relating to the foregoing activities are entered into the relational database. At any time information entity relationships can be dynamically specified without the extensive linker table creation that characterizes conventional database normalization and management. Instead the information entity relationships are consolidated in a common table that can be manipulated by the user employing a conventional editor program. The memory storage that would otherwise be occupied by conventional linker table entries is instead virtual, the necessary linking information being developed dynamically from this common table during the routine operation of the management program of the relational database. This feature greatly improves the utility of the system, by transferring a costly database administration function to the user, so that necessary changes in the structure of the database can be quickly effected.

Also, at any time parameters pertinent to the current phase of the enterprise can be dynamically specified and the allowable range of values recorded.

Management of the enterprise. Analysis, development and maintenance activities are planned with the aid of information extracted from the relational database. Data is recorded in the database by key-punching, electronic transmission, or by other methods known to the art, such as document scanning. Information acquisition activities are planned, scheduled, and monitored. As a result of these activities, the enterprise evolves, and its data structure and entity relations, both linear and hierarchal, are created or modified. Such changes are instituted by the user, assisted by specialized computer programs.

One of these programs functions as an entity relation manager, and facilitates the modification of information entities by the user while automatically preserving relational information links.

A second program is capable of building, inserting, deleting, and relocating hierarchal structural elements.

A third program cooperates with an off-line editor to unload data from the database, interpreting coded data and SQL statements for presentation to the user in natural language. Instructions and data entered by the user via the editor are translated into coded data, table entries, and SQL instructions, loading the output of the editor into appropriate areas of the database in a memory of the computer.

After the relational database is created the enhancements to an ANSI-standard SQL database in accordance with the invention facilitate the recovery of coherent information in a number of areas relating to human performance, of which the following are representative: job/task lists; device specifications; parts lists; systems and equipment performance data; resource utilization, technical manual; student/instructor lists; development schedules; training inventory; curriculum outlines; lesson objectives and specifications; and records of individual and group task performance.

In summary the information management system is implemented in a general purpose computer, or multiple computers. The enhancements in accordance with the invention can be readily implemented in conventional high level programming languages, such as PASCAL and interfaced with ANSI standard SQL database programs. The creation, modification, and operation of a relational database which has been enhanced by the invention hereof in order to manage an enterprise is greatly facilitated and simplified.

BRIEF DESCRIPTION OF THE DRAWINGS

For a better understanding of these and other objects of the present invention, reference is made to the detailed description of the invention which is to be read in conjunction with the following drawings, wherein.

Figure 1:
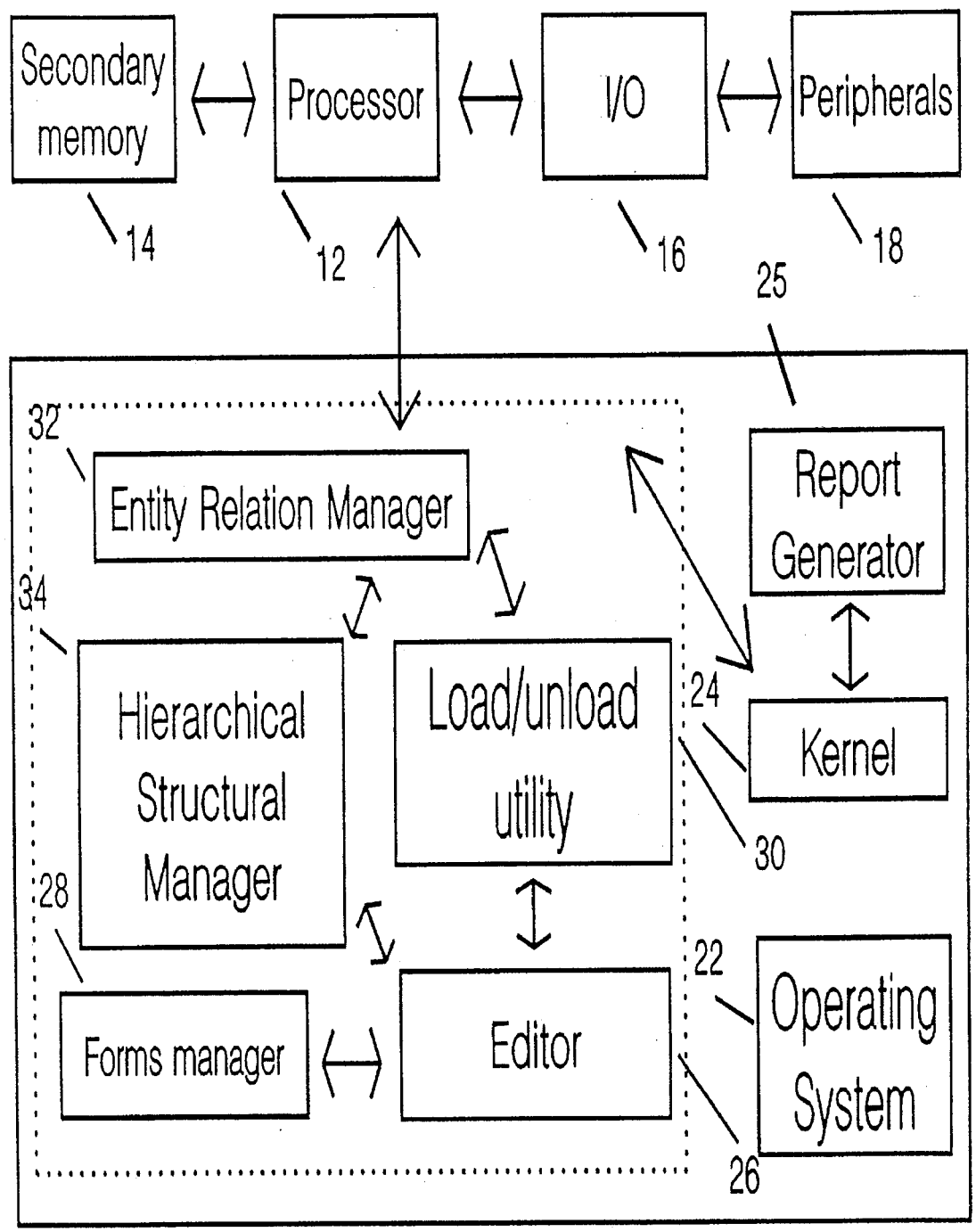
FIG. 1 is a block diagram of the information management system according to the invention.

DESCRIPTION OF THE PREFERRED
EMBODIMENT

The following definitions apply to this disclosure:

(1) information entity—the definition of the content of one table in a relational database;

(2) relationship—the logic of an association between information entities;

(3) object (entity object)—an information datum stored in a row in a table of a relational database;

(4) relationship instantiation—a specific object set associated by a relationship; and (5) recursive or hierarchal structure—an information element or group of related information elements identified by a recursive number.

Turning now to the drawings, and initially to FIG. 1, an information management system in accordance with the invention is implemented in a general purpose computer, indicated generally at 10. While the invention is explained with reference to a single computer for reasons of clarity, it will be appreciated by those skilled in the art that the invention can be practiced in a distributed computing environment, or by multiple users served by a network of single user computers. The data or the executing programs, or both can be distributed, and the invention can be supported by the many distributed architectures now known to the computing art.

Computer 10 includes a processor section 12, secondary memory 14 which could be one or more disk drives, tape units, optical disks, or the like, and an input/output (I/O) section 16, which is linked to peripherals 18, the last including conventional display terminals or work stations, printers, and plotters, and data communications devices such as modems. A primary memory 20, which should preferably be at least 8 megabytes, is accessible to processor 12. An operating system program 22 is initially loaded into secondary memory 14, and may reside in a portion of memory 20 as required. The invention has been successfully operated with the DOS operating system, available from Microsoft, and with the Intel 80286 microprocessor and higher members of the Intel 8086 series with 8 megabytes of primary memory. It can be installed on other hardware platforms and run under virtually any commercial operating system. Typical applications require the secondary memory 14 to be at least 40 megabytes, and much larger secondary memories may be required.

Computer 10 includes a primary or main memory 20, which can hold executing programs and data upon which the programs operate. Executables are shown in block form in FIG. 1. It will be understood that limited portions of a program can be present in memory 20, or can be coresident with portions of other programs at a given time in accordance with the particular memory management techniques employed by the processor 12 and the operating system program 22, as are known in the art. As used herein, primary memory also encompasses enhancements to conventional main memory such as cache memory.

A relational database kernel 24 is installed in secondary memory 14, and loaded by operating system program 22 into primary memory 20 during operation. Any ANSI SQL relational database may be used. The invention has been successfully operated with Oracle, available from Oracle Corp. Kernel 24 operates on data information entities which are defined and supplied by the user as facilitated by programs described below, on linker tables, and on files containing command instructions. Report generator 25 cooperates with kernel 24 to produce a coherent output.

To constitute the relational database in secondary memory 14, entities must first be defined, and then incorporated into tables provided by kernel 24. The user controls the definition of information entities via an editor 26 which provides a convenient interactive environment. Many conventional editors can be employed for this purpose. EDT, available from Boston Business Corporation, is effective. A forms management program 28 is preferably interfaced to editor 26 for enforcing consistency in entity definitions.

The output of editor 26 and forms manager 28 is submitted to a load/unload utility 30. This program accepts natural language text in the context of a form output by forms manager 28, and outputs the information in the form as SQL commands which are acceptable to kernel 24.

Form manager programs are known, and can readily be implemented in a high level language such as PASCAL.

Load/unload utility 30 is particularly useful during the creation of the database for defining parameters that are associated with individual information entities. For example various control/indicator parameters could be associated with an information entity in the context of a machine. The code fragment shown in Appendix "A" from a PASCAL program in accordance with a preferred embodiment illustrates the method of loading types that have been selected by the user via editor 26 and forms manager 28 to be associated with a given information entity.

It will be apparent that SQL statements, depending on the values of control variables as set by the user, are emitted by load/unload utility 30 in form for execution by kernel 24. Load/unload utility 30 also performs the inverse function—extracting encoded and parametric information from the SQL database and presenting the data to the user in a more readily comprehensible form for modification. This is shown by the code fragments in Appendix "B".

When an appropriate table, indicated in the above fragment by the designations beginning with "TR", has been identified, it is read in to primary memory 20 and presented to the user in cooperation with the forms manager 28. After modification by editor 26, the information may be reloaded into the SQL database as described above.

Another aspect of the invention is the capability of dynamically defining many-to-many relationships between information entities, and further of identifying individual objects within each information entity which are specifically related. The defined many-to-many relationships are maintained in a single table (the "CZ" table) which stores information instantiating relationships between specific objects in separate tables. In this respect the invention differs from the known prior art, which requires multiple linker tables to hold a plurality of many-to-many entity relationships. As defined in the SQL file shown in Appendix "E" at E1 (the "CA" table), the columns of the linker table contain: the relationship identification number (entity relation number) of the instantiation; the unique identification of object no. 1; the unique identification of object no. 2; parametric identifiers, if applicable; and a descriptor for the relationship between the objects. A linker table in accordance with the definitional information of the CA table is shown at E2 of Appendix "E" (the "CZ" table). The table at E3 of Appendix "E" presents sample rows from the CZ table in user-readable format. The user can normalize the database and maintain the linker table by invoking entity relation manager 32 in cooperation with editor 26, forms manager 28, and load/unload utility 30. The CZ table is accessed by kernel 24 when information is retrieved from the database, for example by a select statement. Although the contents of the CZ table are modified when many-to-many relationships are defined, the structural organization of the tables in the database is completely undisturbed.

Information is often available in flat data files such as ASCII files. It is frequently the case that the information may more naturally be related hierarchically. This is accomplished by hierarchal structure manager 34 which provides the capability of converting such ASCII files into hierarchal structures, and to restructure the hierarchal relationships as may be desired. The hierarchy is represented by a recursive structure number which encodes:

(1) the level in the structure of each information element or each group of related information elements;

(2) the recursive number of the "parent" information element or group of related information elements; and (3) the sequence number of the information element or group within its structure level; i.e. the relationship between the element or group and its siblings.

Hierarchal structure manager 34 maintains the recursive structure number in several formats:

(1) A coded zero filled recursive format, (e.g. 001001001).

(2) A user format (decimal recursive format, e.g. 1.1.1) consists of a sequence of numbers that are separated by decimals. The structure level is equal to the number of decimals+1, and the sequence number within each level is indicated by an integer.

(3) A sorter format. The recursive structure number is an integer of variable length divided into fields of equal, predetermined length. The structure level is indicated by the number of fields, and the sequence number within a structure level is determined by the integer value of the field. The field length is determined by the integer length of the largest number of information elements or groups expected to exist at any level.

(4) An alphanumeric format. The structure number is a predefined combination of characters, including upper and lower case alpha characters, Arabic numbers, Roman numerals, parentheses, underscores, and periods.

(5) A coded format. The structure is dynamically specified by embedded keys. (e.g. "SL" means start new level)

Hierarchal structure manager 34 performs a number of functions including the interconversion of the above-described data formats, and the provision of a real time user interface that allows the user to enter and modify hierarchal structural relationships and the recursive number describing these relationships.

Hierarchal structures are not readily handled by native SQL databases, and require special processing. It is advantageous to identify tables of information entities containing hierarchal structural information distinctively, so that they can be recognized by the various programs which process these structures.

The processing of hierarchal structures that are resident in the database includes a step of downloading, followed by a classification of the format of a structure being evaluated. A structure could be in either decimal recursive format or zero filled recursive format and in some instances interconversion could be required. Initial processing includes trapping of errors in syntax or field formatting, and in the case of decimal recursive format, the structure level is computed. Potential formatting errors include missing levels, and improper internal number sequencing within a given level. Sequencing errors include lack of incrementation, and ordering errors (e.g. a sequence number being less than a preceding sequence number).

If a hierarchal structure has been found to be valid, the recursive information is parsed to extract needed information in accordance with the following steps:

(1) The length of the hierarchal structure is determined. It will be appreciated from the above discussion that a recursive structure requires variable storage for representation, depending on the number of structural levels and elements within each structure.

(2) The offset within the code where the first datum of interest occurs is determined.

(3) Field buffers and data buffers are loaded with appropriate portions of the hierarchal structure.

(4) The format of the structure is noted, and based on the type of formatting, the information is written from the field and data buffers to a file or presented to the user on a terminal.

It is possible to perform error checking at any point in the above process.

A data file containing recursive structures can be readily formatted for presentation to the user, as illustrated by the PASCAL procedure in Appendix "C".

Procedures such as that of Appendix "C", in cooperation with forms manager 28, allow the user to modify the hierarchal structural relationships of elements within an information entity, or to correct errors which have been trapped during the initial processing described above. Once this has been done, the record can be reconverted to an encoded format and resubmitted to kernel 24 for storage in secondary memory 14. The code fragments found in Appendix "D" illustrate the technique of reloading the SQL database after modification.

The operation of kernel 24 is well known, and will not be further discussed herein.

The following working examples are described with reference to computer screens that would be seen by a user of the preferred embodiment. Where selection menus are displayed, it will be understood that the user would make a selection using a cursor key, or with a pointing device such as a mouse.

EXAMPLE 1

Creation of New Entity Relationship and Use of Same to Develop Tasks Concerned with Performance Evaluation Referring to Appendix "F", at screen F1, entitled "DEFINE ENTITY RELATIONSHIPS", the user names an information entity and enters the identification of two tables which must be related. When this is done, entity relation manager 32 is invoked, and the newly defined relationship is stored in secondary memory 14 in a common linker table (as shown, for example at E3 of Appendix ("E").

In the following screens, F2 and F3, a maintenance task is defined by creating objects associated with the entity named in the previous screen. These two screens list categories of maintenance and functional and physical systems to be maintained in an aircraft. The hierarchal structure of each item is detailed in user format at the left of the screen.

Screen F4 is a composite, in which a screen entitled "SELECT AN ENTITY RELATIONSHIP" is overlaid on the "ANALYZE SYSTEM STRUCTURES" screen, the user having selected item 21 (AIR CONDITIONING/PRESSURIZATION). A list of permissible entity relationships, including the one newly defined, is presented to the user. The selection of a desired relationship also selects a linking form that is next presented to the user as screen F5 in which "LINK TASKS" is overlaid on the "ANALYZE SYSTEM STRUCTURES" screen. In this particular case, the user has selected two items from the tasks list, (2.1 and 2.2), but could have selected as many tasks as were applicable. Upon confirmation, this information is stored, thereby instantiating a relationship.

While not shown in the screens in Appendix "F", it is possible to link a verb to the task structure, and employing report generator 25, build two tasks with this information, e.g.

PERFORM PREVENTIVE MAINTENANCE SYSTEMS PERFORMANCE EVALUATIONS FOR THE AIR CONDITIONING/PRESSURIZATION SYSTEM and PERFORM PREVENTIVE MAINTENANCE SYSTEMS ALIGNMENTS FOR THE AIR CONDITIONING/PRESSURIZATION SYSTEM

EXAMPLE 2

Defining Attributes for an Entity; Linking of Two Attributes to One Another; and Further Linking the Attributes to a Second Entity Referring now to Appendix "G", there is shown a form on screen G1 entitled "DEFINE PARAMETERS". The parameter to be selected is "INFORMATION TYPE". The user selects the type of parameter information, and then inputs a set of values, with a description for the values. In this example, the user chooses to define a set of types of media requirements.

Screen G2 contains the same form, which now displays a set of permissible values for the parameter "MEDIA TYPE", the specific type of media the user selects to meet the requirement. The user is prompted for a selection on the overlay and selects "FFS". In the preferred embodiment, the user sets the cursor on one of the values, and uses a pre-defined "hot key" to call the "RELATED INFORMATION" form, seen as an overlay on screen G3. The object MIR is now linked to the parameter value object FFS.

In the "RELATED INFORMATION" form the user selects "MIR" from a list of object values, and provides a description. At the option of the user, the full screen editor can be invoked to provide detailed information about this object.

Screen G4, captioned "ENTRY OF REQUIREMENT DATA", shows the information that is entered by the user, including formatting codes. The text file is processed, checked and formatted in accordance with the formatting codes. The results of this process are checked by viewing the formatted file, seen in screen G5. When the user is satisfied with the results of the work, he exits the editor. The text file, with embedded formatting commands, is stored in secondary memory 14, and is shown in the RELATED INFORMATION screen at G3. In this example the object FFS has the attribute object MIR, and the associated text description.

Lastly, a subsequent report G6 is developed by report generator 25 from a search by kernel 24 of the CZ table to extract all SYSTEMS EQUIPMENT CONTROLS which have been linked to the object FFS. This report becomes the specific performance requirement for the media FFS of the MIR type.

In subsequent analysis activities (see example 4 below), three objects, including FFS, are assigned to a testing requirement.

EXAMPLE 3

Enable Functional Analysis of Systems and Jobs. Model Hardware and Procedural Systems Used in the Target This example is explained with reference to Appendix "H". The master entity is the DOMAIN, and the IDENTIFY AIRCRAFT entity is used to identify a major system platform as the controlling domain. Users identify the domains as list of records with identification numbers, in this case the MANUFACTURER, SERIES, and MOD. This database is normally controlled by an ADMINISTRATOR (ADM).

The process shown in this example initially on screen H1 creates a DOMAIN, select a domain, builds a recursive structure of objects which are linked to the DOMAIN, links CONTROL POSITIONS and INDICATIONS entities to a selected object in the DOMAIN. In addition it shows the building of an OPERATIONS entity, conducts an analysis of the STEPS entity linked to the OPERATION entity; this last activity automatically builds a link to the DOMAIN. This set of activities links several major entities, TASKS, OPERATIONS, SYSTEM STRUCTURES and DOMAINS, to each other. All links between these entities are stored in the CZ table.

On screen H2, entitled "SPECIFY AIRCRAFT STRUCTURE", when in production, prior to accessing records and objects of interest for analysis, users select the master object of interest (denoted with an "X"). From this point on, all data which is input is automatically linked to this master object in a higher table.

On screen H3, entitled "ANALYZE SYSTEM STRUCTURES" each object of the DOMAIN (displayed in the upper left corner for the user's convenience) can be further decomposed into logical structures (NUMBER) which are understandable to the user. These structures are maintained as recursive number sets which can be manipulated by one of the programs of this embodiment. In this example, as physical objects are being defined, the user identifies specific part numbers and revision numbers associated with the part. It is possible for the database to have parts (or components) which are linked to more than one master object (as sub-systems and components are frequently re-used on functionally different platform.

Screen H4 is entitled "DEFINE CONTROLS". Each component can be further defined with additional information. In this example, a specific equipment component in the DOMAIN database known as TYPE "CON" (control) was queried and selected (marked with an "X"). The selected object's linked information is then automatically queried, this information is displayed on the lower third of the example screen. This screen shows that six values of the POSITIONS parameter are linked to the selected object; what is displayed is the fourth of these six. The operator can scroll through the records to view or modify or add records.

Screen H5 is entitled "DEFINE INDICATORS". Similar to the CONTROLS example, INDICATORS are also further accessed and defined. In this screen, the attributes of the INDICATIONS entity are different than those of the CONTROLS.

To develop descriptions of OPERATIONS, the operator uses the screen H6 to access the DEFINE OPERATIONS database to create lists of STEPS. STEPS are activities which involve manipulation of objects which have been defined in the DOMAIN database. When this entity is accessed from an object in the TASK entity database, a link is automatically created between the object in the OPERATION entity and the TASK object.

Each STEP can be further analyzed in greater detail, as shown on composite screen H7. Depending on the TYPE of step (in this case the TYPE "EQUIPMENT"), an appropriate form overlays for the user to access existing information and add more detail. In this screen, the datum for the attributes VERB, CONTROL, LOCATION, and POSITION are selected as objects from other database entities and linked to this STEP. The FUNCTION object is automatically displayed as this information has been previously defined and linked when the operator developed the CONTROL information for the DOMAIN of interest.

Referring to screen/table H8, entitled "STEP ANALYSIS FORMS", similar STEP analysis are performed on other step entity types.

EXAMPLE 4

Task and Skills Analysis

The TASK AND SKILL ANALYSIS is used by operators to specify & quantify job performance requirements. This process analyzes task factors including criticality, conditions affecting performance, standards of performance and special requirements; it specifies target populations attributes; analyzes difficulties encountered on the job; it also specifies: prerequisite knowledges, skills, attitudes, test methodology & media, and criteria for evaluating job performance. This series of screen displays in Appendix "I" demonstrates the process of conducting an analysis of a TASK. This activity links multiple analysis to an object in the TASK entity structure. In addition this series demonstrates how a multi-rater process occurs, how objects which are stored in the PARAMETERS database are used to define unique entity objects, and how the multi-rater datum are summarized. Also shown is the linking of the KNOWLEDGE, SKILL, AND ATTITUDES entity and a TEST AND TEST MEDIA entity to the TASK ANALYSIS entity.

Referring to screen I1, the POPULATIONS entity is used to define another controlling object. Each population identified is a group of people who share a definable set of common attributes. These groups of people are the ones who perform the TASKS and OPERATIONS which have been previously defined.

Each population, when they perform TASKS have specific ROLES and DUTY POSITIONS which identify attributes of their performance. The objects are defined in the PARAMETERS database as objects, as shown in screens I2 and I3, entitled "DEFINE PARAMETERS".

Referring to the screen I4, entitled "ANALYZE TASK STRUCTURE", to analyze how a POPULATION performs a given TASK the operator first selects a specific object from the TASK entity database by means of a hot-key.

The screen I5 is a composite, which shows the overlay form which the operators use to further analyze the attributes of performance. In this screen, three DUTY POSITIONS and two COCKPIT ROLES have been linked to the task, thus representing that all individuals in all roles (as defined in this series of examples) perform this task. The row showing ANALYSIS NUMBER AND ITERATION NUMBER are many-to-many links (e.g. each analysis can have many iterations). For each identified iteration of an analysis, the operator identifies other attributes such as TASK CONDITION TYPES and associated CONDITIONS, PERFORMANCE STANDARD TYPE and associated STANDARDS. These are linked to each other and to the TASK object of interest. These many-to-many links between objects are all maintained automatically in the LINKER table.

In order to complete an analysis iteration, the operator identifies his judgments about the ability of a population or populations to perform the task as a numerical factor. This iterative method enables many analysts to enter their separate judgments about the task. This function, illustrated on screen I6, entitled "ANALYZE POPULATION PERFORMANCE", is realized as a multi-rater form.

In order to display the results of a multi-rater analysis, the screen I7, entitled "SUMMARIZE A TASK ANALYSIS", processes the data for standard statistics across all raters. The displayed data helps the analysts determine the overall criticality and difficulty of a task for a defined population so that they can assign the task to a training course. The top ⅔ of this screen extracts data from previous iterations, the bottom half is an input screen where a analyst/operator makes a decision about the factors and assigns the task for training (e.g. APPLICABLE CURRICULUM="INITIAL QUALIFICATION"). The types of curriculum are selected as an object VALUE from the PARAMETERS database entity.

Now, referring to the screen I8, entitled "ANALYZE KNOWLEDGES, SKILLS AND ATTITUDES", the operators identify another entity KNOWLEDGE, SKILLS, AND ATTITUDES (KSA). This entity is stored as a recursively related set of records which can be linked to any REFERENCED ENTITY and REFERENCE OBJECT in the database.

Once the KSA object has been linked to the desired entities and objects, the operator can then specify the testing requirements on screen I9. Testing requirements describe how performance standards for tasks and KSAs are to be evaluated and measured, and also define a RATIONALE for this specification. This activity automatically builds an entity relationship between KSAs and TEST AND TEST MEDIA.

Composite screen I10, headed "Select candidate media", shows how the software accesses the objects "FTD and PTT" from the PARAMETERS database by means of the LINK STANDARDS form.

EXAMPLE 5

Definition of Instructional Requirements

Referring now to Appendix "J", the COURSEWARE DESIGN module is a set of tables which the operator uses to defines curriculum, syllabi & specific instructional requirements. It lists curriculum requirements; sequences instruction in a syllabus specific to populations; specifies instructional treatments, media, strategies and training resources for lessons; links treatments to requirements; and, analyzes alternative media costs.

In Appendix "J" there is shown the process of building a CURRICULUM entity, including the linking of CURRICULUM to other objects in the database, defining TREATMENTS, linking TREATMENTS to other objects in the database including the CURRICULUM, and building and linking a SYLLABUS entity to a POPULATION and CURRICULUM.

Referring to screen J1, entitled "DEFINE CURRICULUM", the first activity is to identify the objects in the database which are to be linked to the named CURRICULUM.

In screen J2, entitled "TREATMENT REQUIREMENTS ANALYSIS", each identified object in the curriculum is then linked to the TREATMENTS entity. This process is used to specify the instructional objectives, methods, strategies and media which are to be used to meet the performance and testing requirements which have be analyzed as defined in previous examples herein.

In composite screen J3, the instructional media to be used is linked to the treatment. This is the same set of values which exist as objects in the PARAMETERS database. Once selected, they are automatically linked to TREATMENTS.

In screen J4, also entitled "TREATMENT REQUIREMENTS ANALYSIS", other objects (shown as upper-case values) are also linked to the TREATMENT entity. Other attributes are input to complete the specification (shown as upper/lower mixed case).

The next step in the process is to build a SYLLABUS for a CURRICULUM. The SYLLABUS is a multi-level structure which sequences the TREATMENT objects into a coherent learning structure. In composite screen J5, entitled "DEFINE CURRICULUM", the operator selects a specific CURRICULUM, provides a name for the course, and then provides names for the levels in the learning structure.

The next step in the process of defining a SYLLABUS is to create or design a structure for the curriculum. This entity is accessed by means of a hot key, and when committed, all the links are stored in the LINKER table. In composite screen J6, the SYLLABUS levels identified previously are selected by the operator, as applicable to the SYLLABUS design.

EXAMPLE 6

Analysis of Media Performance Requirements

MEDIA PERFORMANCE REQUIREMENTS are a separate analysis activity for a KNOWLEDGE, SKILL, and ATTITUDE which uses the entity relationships and object definitions set forth in the PARAMETERS database. It presumes the existence of other analysis activities which have defined DOMAINS, SYSTEMS, TASKS, OPERATIONS, TASK ANALYSIS entities, their attributes and associated objects. These activities take place prior to the actual specification of a specific MEDIA PERFORMANCE REQUIREMENT, with reference to Appendix "K". In subsequent analysis activities, the user then selects the media objects and assigns the desired attribute to the entity SPECIFY TEST AND TEST MEDIA. Referring first to screen K1, the Analyst assigns the three objects, including "FFS" to a testing requirement.

A subsequent report, shown on screen K2. searches the relationships (in the CZ table) to extract all SYSTEMS EQUIPMENT CONTROLS which have been linked to the object FFS. This report becomes the specific performance requirement for the media "PTT" of the "MIR" type.

EXAMPLE 7

Processing of Recursive Numbers

The screens in Appendix "L" demonstrate the software process by which the database is exited, an external editor is invoked, the selected information group desired by the operator is automatically extracted from the database and inserted into the editor, how the recursive numbers are edited in the editor, and how the numbers are processed, error checked, and returned to the database with the existing links preserved, and the new objects inserted into the database.

The first step in the process, shown in screen L1, is to select a group of objects of interest. The operator has queried a set of objects of the 1.2 series which are related to the master entity (domain object) indicated in the upper left corner of the form.

Screen L2 shows the same data after it has been extruded from the database and placed in the editor. The numbers within the curly brackets preserve the record identification numbers. The coded entries (.NS) which are necessary for processing automatically inserted, as are all the structural spaces. A few code entries are available to the operator to indicate special process handling functions.

On screen L3 the user types in a new example line, with a mistake in the numbering schema (duplicate structure numbers).

After exiting, the recursive structure processor checks the file for logic errors and advises the operator of Warnings or Fatal errors (refer to screen L4). Screen L5 shows the warning as it is imbedded in the text the operator was working with. If the warning is of no concern to the operator, he merely exits again (see screen L6). In the case of "FATAL" messages, the fault must be corrected before processing will continue.

Upon exit, the structure is re-numbered automatically, the links to the primary object (DOMAIN) are verified. The previously exiting records are re-loaded into the database, with any changes which may have been made. Any new records are automatically linked to the DOMAIN, given a record identification number, and inserted into the database. The system then re-calls the database. Upon re-entry into the database, on screen L7 the operator can see the exact changes which have been made to the structure. The cursor returns to the exact spot which it was at when the processing function was first invoked with the applicable hot key.

While this invention has been explained with reference to the structure disclosed herein, it is not confined to the details set forth and this application is intended to cover any modifications and changes as may come within the scope of the following claims.

Appendix A

```
{ 12 load for Control/Indicator Purpose, function and meaning }
    if (CB_Param_ID = '5101') or (CB_Param_ID = '5103') then
begin
      writeln (GEN_F,'rem LOAD FOR TYPE "',CIPI,
        '" STANDARD. "purpose column"');
    end;
    writeln (GEN_F,'INSERT INTO TRACE_12 (TR_12_01,TR_12_04)');
    write   (GEN_F,'VALUES (',GEN_Seq_Num,',');
    writeln (GEN_F,'''',TR_27_02,''');');
    writeln (GEN_F);
    writeln (GEN_F,'UPDATE TRACE_12');
    writeln (GEN_F,'SET TR_12_02 = (');
    writeln (GEN_F,'SELECT TR_11_01 FROM TRACE_11, TRACE_CZ');
    writeln (GEN_F,'WHERE TR_11_01 = TR_CZ_02 AND');
    writeln (GEN_F,'      TR_CZ_01 = ',LN,' AND');
    writeln (GEN_F,'      TR_CZ_03 = ',AC,' AND');
    writeln (GEN_F,'      TR_11_02 = ''',TR_24_01,'''),');
    if (CB_Param_ID = '5101') or (CB_Param_ID = '5103') then
begin
      write   (GEN_F,'TR_12_05 = ''PURPOSE'' ');
    end else begin
      write   (GEN_F,'TR_12_03 = (SELECT TR_CC_01 FROM TRACE_CC
');
      writeln (GEN_F,'WHERE TR_CC_02 = ',CB_Param_ID);
      write   (GEN_F,'AND UPPER(TR_CC_03) = UPPER(''',CIPI,'''))
');
    end;
    writeln (GEN_F,'WHERE TR_12_01 = ',GEN_Seq_Num,';');
```

Appendix B

```
{ Read file containing the one ATA/DESC line created by EDT }
  if IOresult = 0 then begin readln (DT,rec); close (DT); end
else rec := '';
  if rec > '' then begin
    while copy (rec,1,1) = ' ' do rec := copy
(rec,2,length(rec));
    ata_code := copy (rec,1,pos(' ',rec));
    rec := copy (rec,pos(' ',rec),length(rec));
    while copy (rec,1,1) = ' ' do rec := copy
(rec,2,length(rec));
    ata_desc := copy (rec,3,length(rec));
  end else begin
    ata_code := 'ATA_num'; ata_desc := 'ATA_desc';
  end;

{ See if any data is being passed from the database file }
  if ATA_Offset > 0 then begin
    TheRest := false; dst := 0; ist := 0; rc := 0;
    kc1 := 999; kc2 := 999; kc3 := 999;

{ Either reload the info into the EXT file, or assign desc info
to  Part1 }
    while not AFT (DT) do begin
      readln (DT,rec); rc := rc + 1;
      if NOT TheRest then begin if copy (rec,1,8) = 'TR_25_01' then begin
          Part1[1] := copy(rec,11,length(rec)); kc1 := rc;

end else if copy (rec,1,8) = 'TR_24_03' then begin
          Part1[2] := copy(rec,11,length(rec)); kc2 := rc;

end else if copy (rec,1,8) = 'TR_27_02' then begin
          Part1[3] := copy(rec,11,length(rec)); kc3 := rc;
        end end end
  end;
  writeln (Tmp,'!');
  close (DT);
end
```

Appendix C

```
Procedure Process_Input;
begin
{ MASK THE INPUT FILE AND CHECK FOR EXISTENCE }
  assign (KEY_F,fn1); {$I-} reset (KEY_F); {$I+}

{ IF THE INPUT FILE EXISTS, THEN PROCESS }
  if IOresult = 0 then begin

{ OPEN THE OUTPUT FILE }
    assign (PRT_F,fn2); rewrite (PRT_F);

{ WRITE THE COVER SHEET AND PAGE HEADING INFORMATION }
    Cover_Sheet; nl := 54; PH;

{ SET THE INITIAL RECURSIVE LEVEL }
    PrvL := 1;

{ LOOP UNTIL THE LAST RECORD HAS BEEN READ FROM THE
INPUT  FILE }
    while not aft (KEY_F) do begin { READ A RECORD FROM THE INPUT FILE }
      readln (KEY_F,rec);

{ IF THE RECORD IS NOT BLANK }
      if rec <> '' then begin

{ IF THE RECORD IS A LINE CONTINUATION, WRITE THE
        RECORD AS-IS }
        if copy (rec,1,1) = '&' then begin { Determine the rest of the record }
          rec := copy (rec,pos(' ',rec),length(rec));
          while copy (rec,1,1) = ' ' do rec := copy
          (rec,2,length(rec));

{ Write the initial indent }
          for xx := 1 to Last_Ind do write (PRT_F,' ');
          writeln (PRT_F,rec); PH;

{ IF THE RECORD IS A ".NS" (NEW START), IGNORE THE
        RECORD }
        end else if copy (rec,1,3) = '.NS' then begin { IF THE RECORD IS A "!" COMMENT LINE, IGNORE THE
        RECORD }
        end else if copy (rec,1,1) = '!' then begin { ELSE CHECK TO SEE IF VALID RECORD - ATA [C/I]
DESC}
        end else begin { Strip off leading spaces }
          NumL := 1;
```

```
            while copy (rec,1,1) = ' ' do rec := copy
            (rec,2,length(rec));
            ATA := copy (rec,1,pos(' ',rec)-1);

{ How many levels deep is the ATA }
            for xx := 1 to length (ATA) do
               if copy (ATA,xx,1) = '.' then NumL := NumL +
1;

{ If the level has changed, place a space before
         writing new item }
            if NumL <> PrvL then begin
               writeln (PRT_F); PH; PrvL := NumL;
            end;

{ Write the initial indent }
            for xx := 1 to NumL do write (PRT_F,'   ');

{ Determine the rest of the record }
            rec := copy (rec,pos(' ',rec),length(rec));
            while copy (rec,1,1) = ' ' do rec := copy
            (rec,2,length(rec));
            if (copy (rec,1,2) = 'I ') or (copy (rec,1,2) =
            'C ') then
               writeln (PRT_F,ATA,'
',copy(rec,3,length(rec)))
            else writeln (PRT_F,ATA,' ',rec); PH;
            Last_Ind := (NumL*3) + length (ATA) + 1;
         end;
      end;
    end;
    close (KEY_F); close (PRT_F);
  end;
end;
```

Appendix D

```
Procedure Next_GEN_File; var ch : string [1]; GEN_FN :
string [12];
begin
   GEN_Line_Num := 0;
   writeln (GEN_F); writeln (GEN_F,'SPOOL OFF');
   writeln (GEN_F,'EXIT'); close (GEN_F);
   GEN_File_Idx := GEN_File_Idx + 1;
   str (GEN_File_Idx,ch);
   GEN_FN := 'RELOAD' + ch + '.SQL';
   assign   (GEN_F,GEN_FN); rewrite (GEN_F);
   writeln (GEN_F,'REM RELOAD',ch,' LOADER FILE'); writeln
(GEN_F);
   writeln (GEN_F,'SET TERM OFF');
   writeln (GEN_F,'SET HEADING OFF');
   writeln (GEN_F,'SET LINE 280');
   writeln (GEN_F,'SET ECHO ON');
   writeln (GEN_F,'SPOOL RELOAD',ch,'.LOG');
{ Write the batch invocation record to the RELOAD.BAT file
}
   writeln    (BAT_F,'SQLPLUS    TRACE/TRACE    @RELOAD',ch,'
>NUL');
end;

Procedure Write_GEN_Set;
{$V-}
var
   oldseqnum : string [10]; xxx : integer; sample : string
[80];
begin
{ Increment the loader set Number }
   GEN_Line_Num := GEN_Line_Num + 1;
   if GEN_Line_Num = 400 then Next_GEN_File;

check := copy (rec1,34,3);
   if (check = ' C ') or (check = ' I ') then
      rec1    :=    copy    (rec1,1,34)    +    copy
(rec1,37,length(rec1));

{ Substitute "&" for "/" and correct single quotations
usage }
   if (pos ('&',rec1) > 0) or (pos ('''',rec1) > 0) then
begin
      for i := 1 to length (rec1) do begin
         if rec1[i] = '&' then rec1[i] := '/'
         else if rec1[i] = '''' then begin
            rec2 := rec1[200] + rec2;
            rec1    :=    copy    (rec1,1,i)    +    copy
(rec1,i,length(rec1)); Inc (i);
         end;
      end;
   end;

if (pos ('&',rec2) > 0) or (pos ('''',rec2) > 0) then
begin
```

```
      for i := 1 to length (rec2) do begin
        if rec2[i] = '&' then rec2[i] := '/'
        else if rec2[i] = '''' then begin
           rec2    :=    copy    (rec2,1,i)    +    copy
(rec2,i,length(rec2)); Inc (i);
        end;
      end;
   end;
```

{ Determine if the record is an existing database record
}
```
   if copy (rec1,35,1) = '{' then begin
     oldseqnum := copy (rec1,36,pos('}',rec1)-36);
```

{ Write the old sequence number to the check file for later examination. }
{ File will be checked for possible database deletions, via TRIO process. }
```
     writeln (CHK_F,oldseqnum);
```

{ Cut the sequence number out of the record for reload preparation }
```
     rec1    :=    copy    (rec1,1,34)    +    copy
(rec1,pos('}',rec1)+2,length(rec1));

writeln (GEN_F);
     writeln (GEN_F,'UPDATE TRACE_',TB);
     write   (GEN_F,'  SET TR_',TB,'_02 = ''');
     writeln (GEN_F,copy (rec1,1,pos(' ',rec1)-1),''',');
```

{ If description is longer than 80 chars, truncate }
```
     xxx := length (copy(rec1,35,length(rec1))) + length
(rec2);
     Remove_Trailing_Spaces (rec2);
     if xxx > 80 then begin
        sample := copy (rec1,35,length(rec1)) + rec2;
        rec1 := sample; rec2 := '';
     end;
     write (GEN_F,'       TR_',TB,'_03 = ''');
```

{ WRITE THE DESCRIPTION WHICH WAS EXTRACTED FROM DATA FILE }
```
     writeln (GEN_F,copy (rec1,35,length(rec1)),rec2,'''');
     writeln   (GEN_F,'       WHERE    TR_',TB,'_01    =
',oldseqnum,';');
```

{ Else, the record is new }
```
   end else begin
```
   { Increment the Sequence Number }
```
     GEN_Seq_Num := GEN_Seq_Num + 1;
     writeln (GEN_F);
     write (GEN_F,'INSERT INTO TRACE_',TB,' ');
     xxx := length (copy(rec1,35,length(rec1))) + length
(rec2);

Remove_Trailing_Spaces (rec2);
```

```
    if xxx > 80 then begin
      sample := copy (rec1,35,length(rec1)) + rec2;
      rec1 := sample; rec2 := '';
    end;

writeln
(GEN_F,'(TR_',TB,'_01,TR_',TB,'_02,TR_',TB,'_03)');
    write (GEN_F,'   VALUES (',GEN_Seq_Num);
    write (GEN_F,',''',copy (rec1,1,pos('
',rec1)-1),'''');

{ WRITE THE DESCRIPTION WHICH WAS EXTRACTED FROM DATA
FILE }
    writeln (GEN_F,',''',copy
(rec1,35,length(rec1)),rec2,''');');

{ Write the CZ load. 01-Link Number, 02-Task ID, Number }
    writeln (GEN_F);
    write    (GEN_F,
     'INSERT INTO TRACE_CZ (TR_CZ_01,TR_CZ_02,TR_CZ_03)
');
    writeln (GEN_F,
     'VALUES (',LN,',',GEN_Seq_Num,',',AC,');');
  end;
```

Appendix E

E1

```
DROP CLUSTER LINKS;
DROP INDEX LINKS_IN;
DROP INDEX LINK_ID_IN;
DROP INDEX LINK_COLS;
DROP TABLE TRACE_CA;

CREATE CLUSTER LINKS (LINK_ID NUMBER(8));
CREATE INDEX LINKS_IN ON CLUSTER LINKS;
CREATE TABLE TRACE_CA (
/*
Col Name  Data Type  Constraint   Data Description = = = = = = = =    = = = = = = = = =    = = = = = = = = = =
=============================================  */
TR_CA_01 NUMBER(8) NOT NULL      /* Link object ID
     */
                   PRIMARY
                   KEY,
TR_CA_02 CHAR(8)   NOT NULL,     /* Object 1 table/column name
     */
TR_CA_03 CHAR(8)   NOT NULL,     /* Object 2 table/column name
     */
TR_CA_04 CHAR(8),                /* Object 3 table/column name
     */
TR_CA_05 CHAR(8),                /* Object 4 table/column name
     */
TR_CA_06 NUMBER(8),              /* Parameter object ID
     */
TR_CA_07 CHAR(80)  NOT NULL,     /* Link name
     */
TR_CA_08 CHAR(255)               /* Description of entity relationship
     */
)
CLUSTER LINKS (TR_CA_01);

CREATE UNIQUE INDEX LINK_ID_IN ON TRACE_CA (TR_CA_01);
CREATE UNIQUE INDEX LINK_COLS ON TRACE_CA
(TR_CA_01,TR_CA_02, TR_CA_03, TR_CA_04, TR_CA_05);
```

E2

```
DROP TABLE TRACE_CZ;
DROP INDEX TR_CZ_IN;

CREATE TABLE TRACE_CZ (
/*
Col Name  Data Type  Constraint   Data Description
```

```
= = = = = = = =      = = = = = = = =      = = = = = = = = =
=============================================== */
TR_CZ_01 NUMBER(8) NOT NULL      /* Link object ID
        */
    REFERENCES TRACE_CA (TR_CA_01),
TR_CZ_02 NUMBER(8) NOT NULL,     /* Object ID of linked element 1
        */
TR_CZ_03 NUMBER(8) NOT NULL,     /* Object ID of linked element 2
        */
TR_CZ_04 NUMBER(8),              /* Object ID of linked element 3
        */
TR_CZ_05 NUMBER(8)               /* Object ID of linked element 4
        */
)
CLUSTER LINKS (TR_CZ_01);

CREATE UNIQUE INDEX TR_CZ_IN ON TRACE_CZ
(TR_CZ_01,TR_CZ_02,TR_CZ_03,TR_CZ_04,TR_CZ_05);

EXIT
```

E3

| E.R. NO. | OBJECT 1 | OBJECT 2 | PARAM ID | RELATIONSHIP NAME |
|---|---|---|---|---|
| 617 | TR_04_01 | TR_CC_01 | 5603 | TASK ANALYSIS APPLICABLE MEDIA |
| 801 | TR_05_01 | TR_05_01 | 0 | KSA SUPPORTING KSA |
| 901 | TR_N1_01 | TR_N2_01 | 0 | NAME APPLICABLE COMPANY |
| 902 | TR_N1_01 | TR_N4_01 | 0 | NAME APPLICABLE PHONE NUMBERS |
| 903 | TR_N1_01 | TR_N3_01 | 0 | NAME APPLICABLE ADDRESS |
| 904 | TR_N2_01 | TR_N4_01 | 0 | COMPANY APPLICABLE PHONE NUMBERS |
| 905 | TR_N2_01 | TR_N3_01 | 0 | COMPANY APPLICABLE ADDRESS |
| 20001 | TR_11_01 | TR_CC_01 | 30000 | EQUIPMENT MATERIAL TYPE |

Appendix F

```
TRACE MAINTENANCE TASK GENERATOR
```

```
F1                =[ DEFINE ENTITY RELATIONSHIPS ]=              DBA

Relationship SYSTEM ELEMENT APPLICABLE MAINTENANCE      Link ID 814
  Description Entity 1 Object ID TR_11_01     Parameter ID Entity 2 Object ID TR_01_01     Param Name Entity 3 Object ID Entity 4 Object ID Specify relationship between system elements and maintenance tasks Copyright 1992 TRACE TECHNOLOGIES, INC.
```

| F2 | B767-300 | =[ ANALYZE TASK STRUCTURE ]= | USR |
|---|---|---|---|
| Number | Type | Description | |
| 1 | | FLIGHT LINE | |
| 1.1 | PREVENTI | PREFLIGHT SYSTEMS CHECKS AND INSPECTIONS | |
| 1.2 | PREVENTI | LUBRICATION, REPLENISHMENT AND CLEAN | |
| 1.3 | CORRECTI | FAULT DETECTION AND LOCATION | |
| 1.4 | CORRECTI | LRU REPLACEMENT | |
| 1.5 | CORRECTI | ADJUSTMENT | |
| 2 | | FIRST ECHELON | |
| 2.1 | PREVENTI | SYSTEMS PERFORMANCE EVALUATIONS | |
| 2.2 | PREVENTI | SYSTEMS ALIGNMENTS | |
| 2.3 | CORRECTI | FAULT DETECTION AND ISOLATION | |
| 2.4 | CORRECTI | COMPONENT REMOVAL AND REPLACEMENT | |
| 2.5 | CORRECTI | COMPONENT REPAIR | |
| 2.6 | MODIFICA | KIT INSTALLATION | |
| 3 | | DEPOT | |
| 3.1 | OVERHAUL | INSPECTION | |
| 3.2 | OVERHAUL | REBUILD | |
| 3.3 | MODIFICA | MODIFY | |

Copyright 1992 TRACE TECHNOLOGIES, INC.

| F3 | B767-300 | =[ ANALYZE SYSTEM STRUCTURES ]= | | USR |
|---|---|---|---|---|
| Number | Typ | Name | Part | Rev. |
| 21 | SYS | AIR CONDITIONING/PRESSURIZATION | CA-234 | 19 |
| 21.20 | SUB | Distribution | CA-119 | 0 |
| 21.30 | SUB | Pressurization | CA-120 | 7 |
| 21.30.1 | IND | Flight Altitude Indicator | 700641 | 0 |
| 21.30.2 | CON | Flight Altitude Selector | 700222 | 4 |
| 21.30.3 | CON | Landing Altitude Selector | 700412 | 4 |
| 21.30.4 | IND | Auto Fail Light | 700912 | 0 |
| 21.30.5 | IND | Off Schedule Descent Light | 700117 | 3 |
| 21.30.6 | IND | Standby Light | 700663 | 8 |
| 21.30.7 | IND | Manual Light | 700913 | 0 |

Select applicable maintenance for each system element.

Copyright 1992 TRACE TECHNOLOGIES, INC.

```
F4    737-300        =[ ANALYZE SYSTEM STRUCTURES ]=                    USR
```

| Number | Typ | Name | Part | Rev. |
|---|---|---|---|---|
| 21 | SYS | AIR CONDITIONING/PRESSURIZATION | | |
| 21.20 | | | | |
| 21.30.1 | | SELECT AN ENTITY RELATIONSHIP | | |
| 21.30.2 | | | | |
| 21.30.3 | | EQUIPMENT MATERIAL TYPE | | |
| 21.30.4 | | SYSTEM ELEMENT APPLICABLE MAINTENANCE | | |
| 21.30.5 | | SYSTEM EQUIPMENT APPLICABLE ABNORMAL INDICATIONS | | |
| 21.30.6 | | SYSTEM EQUIPMENT APPLICABLE AIRCRAFT | | |
| 21.30.7 | | SYSTEM EQUIPMENT APPLICABLE CONTROL POSITIONS | | |
| 21.30.8 | | SYSTEM EQUIPMENT APPLICABLE CONTROL TYPE | | |
| 21.30.9 | | SYSTEM EQUIPMENT APPLICABLE INDICATOR TYPE | | |
| 21.30.10 | | SYSTEM EQUIPMENT APPLICABLE LOCATIONS | | |
| 21.30.11 | | SYSTEM EQUIPMENT APPLICABLE NORMAL INDICATIONS | | |
| 21.30.12 | | | | |
| 21.30.13 | | | | |
| 21.30.14 | IND | Outflow Valve Position Indicator | | |
| 21.30.15 | CON | Outflow Valve Manual Control Switch | | |

———————————————————Copyright 1992 TRACE TECHNOLOGIES, INC.———

Use UP/DOWN arrows to locate relationship, F10 to select, ESC to Exit
Count: *9                                                    <Insert>

```
F5    B767-300       =[ ANALYZE SYSTEM STRUCTURES ]=                    USR
```

| Number | Typ | Name | Part | Rev. |
|---|---|---|---|---|
| 21 | SYS | AIR CONDITIONING/PRESSURIZATION | CA-234 | 19 |

```
                        =[ LINK TASKS ]=                                USR
```

| L | Number | Typ | Description |
|---|---|---|---|
| | 1 | | FLIGHT LINE |
| | 1.1 | PRE | PREFLIGHT SYSTEMS CHECKS AND INSPECTIONS |
| | 1.2 | PRE | LUBRICATION, REPLENISHMENT AND CLEAN |
| | 1.3 | COR | FAULT DETECTION AND LOCATION |
| | 1.4 | COR | LRU REPLACEMENT |
| | 1.5 | COR | ADJUSTMENT |
| | 2 | | FIRST ECHELON |
| X | 2.1 | PRE | SYSTEMS PERFORMANCE EVALUATIONS |
| X | 2.2 | PRE | SYSTEMS ALIGNMENTS |
| | 2.3 | COR | FAULT DETECTION AND ISOLATION |
| | 2.4 | COR | COMPONENT REMOVAL AND REPLACEMENT |

Appendix G

```
TRACE MEDIA SPECIFICATION PROCESS
```

| G1 | =[ DEFINE PARAMETERS ]= | | ADM |
|---|---|---|---|
| Parameter  INFORMATION TYPE | | ID 5601 | #Values 3 |
| Description | | | |
| Value | Description | | |
| MIA | Media Instructional Application | | |
| MIR | Media Instructional Requirements | | |
| MSR | Media Support Requirements | | |

Define types of media requirements.

———Copyright 1992 TRACE TECHNOLOGIES, INC.———

| G2 | =[ DEFINE PARAMETERS ]= | | ADM |
|---|---|---|---|
| Parameter  MEDIA TYPE | | ID 5603 | #Values 6 |
| Description Types of available media. | | | |
| Value | Description | | |
| CAI | Computer Aided Instruction | | |
| CBT | Computer Based Training | | |
| FFS | Full Flight Simulator | | |
| FTD | Flight Training Device | | |
| PTT | Part Task Trainer | | |

Define media application attributes.

———Copyright 1992 TRACE TECHNOLOGIES, INC.———

| G3 | =[ DEFINE PARAMETERS ]= | | ADM |
|---|---|---|---|
| Parameter  MEDIA TYPE | | ID 5603 | #Values 6 |
| Description Types of available media. | | | |
| Value | Description | | |
| CAI | Computer Aided Instruction | | |
| CBT | Computer Based Training | | |
| FFS | Full Flight Simulator | | |

Enter instructional application.

Information Type MIR                                          Record 1/1

Information Name Full Flight Simulator General Instructional Requirements
     Information ———Copyright 1992 TRACE TECHNOLOGIES, INC.———

G4 ENTRY OF REQUIREMENT DATA

```
....|....1....|....2....|....3....|....4....|....5....|....6....|....7....|....|
.list
.le; Simulate aircraft responses to flight control movements.
.le; Simulate events entered in to the Line Operation Scenario (LOS).
.le; Monitor and record crew and aircraft behavior.
.endlist
[EOB]
```

Enter requirement data with optional embedded format keys.

Buffer: MAIN    File: editlong.lis    |Insert   |Adv  |[4,52]

G5

LIST     1     8     10-14-92 14:58     X_RUNOFF.MEM

A. Simulate aircraft responses to flight control movements.

B. Simulate events entered in to the Line Operation Scenario (LOS).

C. Monitor and record crew and aircraft behavior.

> Review formatted requirement.

Command:     * End-of-file *          Keys: PgUp PgDn F10=exit F1=Help

G6

> Specify Media Performance Requirements

OCTOBER 16, 1992     BOEING 757 CONTROLS - FINAL STATES     Page:     1

| ATA CODE | SYSTEM EQUIPMENT CONTROL | ID NO. | FINAL STATE |
| --- | --- | --- | --- |
| 21.30.2 | Flight Altitude Selector | 1829 | PUSHED AND ROTATED |
|  |  | 1674 | BACKCOURSE |
|  |  | 1684 | CUTOFF |
|  |  | 1728 | LANDING |
|  |  | 1669 | AUTO |
|  |  | 1709 | FUEL |
| 21.30.3 | Landing Altitude Selector | 1830 | OUTER KNOB |
|  |  | 1831 | INNER KNOB |
| 21.30.9 | Flight/Ground Switch | 1834 | GRD |
|  |  | 1835 | FLT |
| 21.30.11 | Cabin Rate Selector | 1725 | INDEX MARK |
|  |  | 1840 | DECR |
|  |  | 1841 | INCR |
| 21.30.13 | Cabin Altitude Selector | 1830 | OUTER KNOB |
|  |  | 1831 | INNER KNOB |

> Media performance requirements; PTT control positions.

OCTOBER 16, 1992     BOEING 757 INDICATORS - FINAL STATES     Page:     1

| ATA CODE | SYSTEM EQUIPMENT INDICATOR | ID NO. | FINAL STATE |
| --- | --- | --- | --- |
| 21.30.1 | Flight Altitude Indicator | 1843 | ILLUMINATED (AMBER) |
| 21.30.5 | Auto Fail Light | 1843 | ILLUMINATED (AMBER) |
| 21.30.6 | Off Schedule Descent Light | 1843 | ILLUMINATED (AMBER) |
|  |  | 1845 | EXTINGUISHED |
| 21.30.7 | Standby Light | 1844 | ILLUMINATED (GREEN) |
| 21.30.8 | Manual Light | 1844 | ILLUMINATED (GREEN) |
| 21.30.12 | Cabin Altitude Indicator | 1846 | READOUT |
| 21.30.14 | Outflow Valve Position Indicator | 1847 | OPEN |
|  |  | 1848 | CLOSE |
|  |  | 1849 | INTERMEDIATE |

> Media performance requirements; PTT indicator indications.

Appendix H

```
┌─────────────────────────────────────────────────────────────────────────────┐
│ H1                     =[ IDENTIFY AIRCRAFT ]=                          ADM │
├────┬──────────────────┬────────────────────────────┬────────────────────────┤
│ ID │ Manufacturer     │ Series                     │ Mod                    │
├────┼──────────────────┼────────────────────────────┼────────────────────────┤
│ 1  │ BOEING           │ 737                        │ 200                    │
│ 2  │ BOEING           │ 737                        │ 300                    │
│ 3  │ BOEING           │ 737                        │ 400                    │
│ 4  │ BOEING           │ 767                        │ 200                    │
│ 5  │ BOEING           │ 767                        │ 300                    │
│ 6  │ BOEING           │ 767                        │ 300ER                  │
│    │                  │                            │                        │
│            ┌─────────────────────────────────────────────────┐              │
│            │ Enter/update aircraft types in the database.    │              │
│            └─────────────────────────────────────────────────┘              │
│                                        Copyright 1992 TRACE TECHNOLOGIES, INC.│
└─────────────────────────────────────────────────────────────────────────────┘
```

```
┌─────────────────────────────────────────────────────────────────────────────┐
│ H2                   =[ SPECIFY AIRCRAFT STRUCTURE ]=                   USR │
├────┬──────────────────┬────────────────────────────┬────────────────────────┤
│ S  │ Manufacturer     │ Series                     │ Mod                    │
├────┼──────────────────┼────────────────────────────┼────────────────────────┤
│    │ BOEING           │ 737                        │ 200                    │
│    │ BOEING           │ 737                        │ 300                    │
│    │ BOEING           │ 737                        │ 400                    │
│    │ BOEING           │ 767                        │ 200                    │
│ X  │ BOEING           │ 767                        │ 300                    │
│    │ BOEING           │ 767                        │ 300ER                  │
│                                                                             │
│              ┌───────────────────────────────────────────┐                  │
│              │ Select an aircraft for analysis.          │                  │
│              └───────────────────────────────────────────┘                  │
│                                        Copyright 1992 TRACE TECHNOLOGIES, INC.│
└─────────────────────────────────────────────────────────────────────────────┘
```

```
┌─────────────────────────────────────────────────────────────────────────────┐
│ ACFT B767-300   H3        =[ ANALYZE SYSTEM STRUCTURES ]=              USR  │
├────────────┬──────┬──────────────────────────────────────┬────────┬─────────┤
│ Number     │ Typ  │ Name                                 │ Part   │ Rev.    │
├────────────┼──────┼──────────────────────────────────────┼────────┼─────────┤
│ 21         │ SYS  │ AIR CONDITIONING/PRESSURIZATION      │ CA-234 │ 19      │
│ 21.20      │ SUB  │ Distribution                         │ CA-119 │ 0       │
│ 21.30      │ SUB  │ Pressurization                       │ CA-120 │ 7       │
│ 21.30.1    │ IND  │ Flight Altitude Indicator            │ 700641 │ 0       │
│ 21.30.2    │ CON  │ Flight Altitude Selector             │ 700222 │ 4       │
│ 21.30.3    │ CON  │ Landing Altitude Selector            │ 700412 │ 4       │
│ 21.30.4    │ IND  │ Auto Fail Light                      │ 700912 │ 0       │
│ 21.30.5    │ IND  │ Off Schedule Descent Light           │ 700117 │ 3       │
│ 21.30.6    │ IND  │ Standby Light                        │ 700663 │ 8       │
│ 21.30.7    │ IND  │ Manual Light                         │ 700913 │ 0       │
│     ┌─────────────────────────────────────────────────────────────┐         │
│     │ Model the functional and physical aircraft system structures.│        │
│     └─────────────────────────────────────────────────────────────┘         │
│                                        Copyright 1992 TRACE TECHNOLOGIES, INC.│
└─────────────────────────────────────────────────────────────────────────────┘
```

```
┌─────────────────────────────────────────────────────────────────────────────┐
│ ACFT B767-300   H4         =[ DEFINE CONTROLS ]=                        USR │
├─┬──────────────┬────┬──────────────────────────────────┬──────────┬─────────┤
│S│   Number     │ Typ│             Name                 │  Part    │  Rev.   │
├─┼──────────────┼────┼──────────────────────────────────┼──────────┼─────────┤
│X│ 21.30.2      │ CON│ Flight Altitude Selector         │ 700222   │ 4       │
│ │ 21.30.3      │ CON│ Landing Altitude Selector        │ 700412   │ 4       │
│ │              │    │                                  │          │         │
│ │     ┌──────────────────────────────────────────────────┐        │         │
│ │     │ Define the attributes of each aircraft control,  │        │         │
│ │     │ including keyboards and touch screens.           │        │         │
│ │     └──────────────────────────────────────────────────┘        │         │
│ │              │    │                                  │          │         │
├─┴──────────────┴────┴──────────────────────────────────┴──────────┴─────────┤
│ Type      KNOB                                                              │
│ Location  Pressurization Panel - Overhead Panel          Record 1/1         │
│ Purpose   Sets cabin cruise altitude.                                       │
│ ─────────────────────────────[ POSITIONS ]────────────────────────────────  │
│ Position  PUSHED AND ROTATED                             Record 4/6         │
│ Function  Selects cabin cruise altitude.                                    │
│                                       ──Copyright 1992 TRACE TECHNOLOGIES, INC.──│
└─────────────────────────────────────────────────────────────────────────────┘

┌─────────────────────────────────────────────────────────────────────────────┐
│ ACFT B767-300   H5         =[ DEFINE INDICATORS ]=                      USR │
├─┬──────────────┬────┬──────────────────────────────────┬──────────┬─────────┤
│S│   Number     │ Typ│             Name                 │  Part    │  Rev.   │
├─┼──────────────┼────┼──────────────────────────────────┼──────────┼─────────┤
│X│ 21.30.1      │ IND│ Flight Altitude Indicator        │ 700641   │ 0       │
│ │ 21.30.4      │ IND│ Auto Fail Light                  │ 700912   │ 0       │
│ │ 21.30.5      │ IND│ Off Schedule Descent Light       │ 700117   │ 3       │
│ │ 21.30.6      │ IND│ Standby Light                    │ 700663   │ 8       │
│ │     ┌──────────────────────────────────────────────────┐        │         │
│ │     │ Define the attributes of each aircraft indicator,│        │         │
│ │     │ including computer displays and aural warnings.  │        │         │
│ │     └──────────────────────────────────────────────────┘        │         │
├─┴──────────────┴────┴──────────────────────────────────┴──────────┴─────────┤
│ Type      LIGHT                                                             │
│ Location  Pressurization Panel - Overhead Panel          Record 1/1         │
│ Purpose   Indicates the status of the Automatic Pressurization Control System.│
│ ─────────────────────────────[ INDICATIONS ]──────────────────────────────  │
│ Normal    NOT ILLUMINATED                                Record 1/1         │
│ Meaning   Indicates cabin pressure is at selected altitude.                 │
│ Abnormal  ILLUMINATED RED                                Record 1/1         │
│ Meaning   Indicates automatic pressurization control failure.               │
│                                       ──Copyright 1992 TRACE TECHNOLOGIES, INC.──│
└─────────────────────────────────────────────────────────────────────────────┘

┌─────────────────────────────────────────────────────────────────────────────┐
│ H6                         =[ DEFINE OPERATION ]=                       USR │
├─────────────────────────────────────────────────────────────────────────────┤
│ Name  SET CABIN PRESSURE                       Record 1/1      Steps 4      │
│ Desc                                           Operation type               │
├──────┬──────────┬───────────────────────────────────────────────────────────┤
│ Step │  Type    │                      Purpose                              │
├──────┼──────────┼───────────────────────────────────────────────────────────┤
│  1   │ EQUIPMEN │ SET FLIGHT ALTITUDE SELECTOR PUSHED AND ROTATED TO ALTITUDE│
│  2   │ OBSERVAT │ OBSERVE STANDBY LIGHT ILLUMINATED (GREEN)                 │
│  3   │ DECISION │ IF ILLUMINATED (GREEN) DO PERFORM PREFLIGHT/BEFORE START OPERATI│
│  4   │ SUB-OPER │ DO PERFORM PREFLIGHT/BEFORE START OPERATIONS              │
│      │          │                                                           │
│      │  ┌──────────────────────────────────────────────────────┐            │
│      │  │ Define aircraft system operations and their          │            │
│      │  │ constituent actions.  When accessed via task         │            │
│      │  │ structures, new operations are automatically linked  │            │
│      │  │ to the applicable task.                              │            │
│      │  └──────────────────────────────────────────────────────┘            │
│      │          │                                                           │
│                                       ──Copyright 1992 TRACE TECHNOLOGIES, INC.──│
└─────────────────────────────────────────────────────────────────────────────┘
```

| Analyze individual actions required to manipulate aircraft system controls |
|---|

| Name | SET CABIN PRESSURE | | Record 1/1 | Steps 4 |
|---|---|---|---|---|
| Desc | | H7 | Operation type | |

| Step | Type | Purpose |
|---|---|---|
| 1 | EQUIPMEN | SET FLIGHT ALTITUDE SELECTOR PUSHED AND ROTATED TO ALTITUDE |

| ANALYZE AN EQUIPMENT OPERATION |
|---|
| Verb SET |
| Control KNOB |
| Location Pressurization Panel - Overhead Panel |
| Position PUSHED AND ROTATED |
| Function Sets cabin cruise altitude. |
| |
| Cntg Act        Comn Err        Correction |
| Behavior        Criteria |

| H8 | STEP ANALYSIS FORMS |
|---|---|
| ( 1) | Equipment Operation |
| ( 2) | Observation |
| ( 3) | Sub-Operation |
| ( 4) | Decision |
| ( 5) | Transmission of Information |
| ( 6) | Reception of Information |
| ( 7) | Standard Action |
| ( 8) | Unlimited Action |
| ( 9) | Operation Note |
| (10) | Operation Caution |
| (11) | Operation Warning |

Appendix I

| I1 | =[ DEFINE POPULATIONS ]= | | | | | ADM |
|---|---|---|---|---|---|---|
| Description | Min Size | Max Size | Dty | Sys | Min Hours | Max Hours |
| 737-100/200 CAPTAIN | 900 | 1400 | 3 | 3 | 10000 | 15000 |
| 737-100/200 FIRST OFFICER | 1000 | 1600 | 1 | 2 | 2000 | 7000 |
| 737-300/400 CAPTAIN | 100 | 700 | 3 | 4 | 10000 | 15000 |
| 737-300/400 FIRST OFFICER | 150 | 800 | 1 | 3 | 2000 | 7000 |

Define the characteristics of a student population of n size. Where n > 0.

―――Copyright 1992 TRACE TECHNOLOGIES, INC.―――

| I2 | =[ DEFINE PARAMETERS ]= | ADM |
|---|---|---|

Parameter   COCKPIT ROLE                                    ID 5303    #Values 4
Description COCKPIT ROLE DESCRIBES A TYPE OF ACTIVITY A CREWMAN MAY TAKE IND

| Value | Description |
|---|---|
| FLIGHT ENGINEER<br>NAVIGATOR<br>PILOT FLYING<br>PILOT NOT FLYING | Define cockpit roles. |

―――Copyright 1992 TRACE TECHNOLOGIES, INC.―――

| I3 | =[ DEFINE PARAMETERS ]= | ADM |
|---|---|---|

Parameter   DUTY POSITION                                   ID 5302    #Values 4
Description DUTY POSITIONS IN THE DUTY POSITION FIELD FOR AIRCRAFT COCKPIT O

| Value | Description |
|---|---|
| CAPTAIN<br>FIRST OFFICER<br>SECOND OFFICER<br>FLIGHT ATTENDANT | Define duty positions. |

―――Copyright 1992 TRACE TECHNOLOGIES, INC.―――

```
ACFT B767-300   I4        =[ ANALYZE TASK STRUCTURE ]=              USR
```

| Number | Type | Description |
|--------|------|-------------|
| 1 | NORMAL | GROUND OPERATION |
| 1.1 | NORMAL | Perform Flight Planning Operations |
| 1.1.1 | NORMAL | Assess Environmental Factors |
| 1.1.2 | NORMAL | Perform Dispatch Duties |
| 1.1.3 | NORMAL | Review/Assess Aircraft Maintenance Status |
| 1.1.4 | NORMAL | Review/Assess Operational Factors |
| 1.1.5 | NORMAL | Perform Communications |
| 1.2 | NORMAL | Perform Preflight/Before Start Operations |
| 1.2.1 | NORMAL | Perform Initial Power Up Procedures |
| 1.2.2 | NORMAL | Perform Exterior Preflight Procedures |
| 1.2.3 | NORMAL | Perform Interior Preflight Procedures |
| 1.3 | NORMAL | Perform Pushback/Start Operations |

Model the job being trained.

Copyright 1992 TRACE TECHNOLOGIES, INC.

---

I5

Analyze task factors and performance objectives in the operational domain.

| 1.2.1 | NORMAL | Perform Initial Power Up Procedures |

=[ ANALYZE TASK OBJECTIVES AND FACTORS ]=                USR

Aircraft 1            Duty Positions 3           Cockpit Roles 2

Analysis Number 1/1      Iteration Number 1/1

Operational Interval 2    Performance Time 3.0    Ctg/Emer Tasks    2 Aids 0

Task Condition Types N/A                                    Conditions 0

Performance Standard Types 2                                Standards 2

Consequence of Error Code 3 Rationale ROUTINE TASK

Maximum Interval permitted between Rehearsals 10    Currency Candidate Y

Copyright 1992 TRACE TECHNOLOGIES, INC.

---

I6

ACFT B767-300    Analyze task factors and predict the performance in the training domain of a defined student population.

| Number | | |
|--------|---|---|
| 1.2.1 | NORMAL | Perform Initial Power Up Procedures |

=[ ANALYZE POPULATION PERFORMANCE ]=

Population 737-100/200 CAPTAIN                        Iteration 1/1

Diff Sub Factors ... Decision 0 .Coordination 0 .Fatigue 1 .Recall 3 .Time 2
Diff Sub Factors ... Physical 0 ..Recognition 3 ..Stress 0 ..Habit 4
Overall Difficulty 2     Interval to Maintain Proficiency 15     Prof Code 4
Proficiency Rationale
Previous experience is applicable.
 Academic Test Data .......Pred Entry 90 ....Meas Entry     .....Meas Exit
Practical Test Data .......Pred Entry 90 ....Meas Entry     .....Meas Exit
  Flt/Sim Test Data .......Pred Entry 90 ....Meas Entry     .....Meas Exit
Rehearsals to Attain Proficiency .............Predicted 2   ......Measured Copyright 1992 TRACE TECHNOLOGIES, INC.

```
I7              =[ SUMMARIZE A TASK ANALYSIS ]=                        USR
Task Perform Initial Power Up Procedures
────────────────────[ ANALYSIS STATISTICS ]────────────────────
Task Analyses Iterations 1/4    Pop. Performance Analyses Iterations 1/3

Factors                 Minimum  Maximum   Mean    Std. Dev.
=================================  =======  =======  =======  =========
Consequence of Error Score              2        3     2.70        .73
Relative Difficulty Score               1        2     1.10        .89
Rehearsals to Achieve Proficiency       1        1     1.00        .00
Interval to Maintain Proficiency (days) 15      30    23.70      10.20
Proficiency Difference Score            4        4     4.00        .00
Criticality Score                       3        5     3.80
Currency Event Candidate   Yes  3  No  2
────────────────────[ DESIGNATED TASK ATTRIBUTES ]────────────────────
Difficulty Code 1   Proficiency Difference Code 4   Permitted Interval 20
Rehearsals to Achieve Proficiency 1     Interval to Maintain Proficiency 30
Currency Event Y  Consequence of Error Code 3   Critical Task N
Applicable Curriculum Initial Qualification
                                ────Copyright 1992 TRACE TECHNOLOGIES, INC.──
```

```
I8            =[ ANALYZE KNOWLEDGES, SKILLS AND ATTITUDES ]=           USR

Cur KSA Lev  1  Count 2    Cur KSA 4      No. of Supporting KSAS 0

KSA Type   S   KSA Generation Mode A   Proficiency Objective Level SPO

KSA NAME Perform Initial Power Up Procedures

KSA Verb PERFORM

Ref Entity SUBTASK

Ref Object Perform Initial Power Up Procedures

Training Type PROCEDURE

Level REMEMBER

Specification

────Copyright 1992 TRACE TECHNOLOGIES, INC.──
```

```
Specify test requirements. |NOWLEDGES, SKILLS AND ATTITUDES ]=         USR
I9
  Cur KSA Lev  1  Count 2    Cur KSA 4      No. of Supporting KSAS 0

KSA Type   S   KSA Generation Mode A   Proficiency Objective Level SPO

KSA NAME Perform Initial Power Up Procedures

KSA Verb PERFORM
```

```
                  [ SPECIFY TEST AND TEST MEDIA ]                      ADM

Test Type Qualification Evaluation

Requirement Perform operation from memory.

Selected Media 2

Rationale Company policy number 25C.
```

| Select candidate media. | NOWLEDGES, SKILLS AND ATTITUDES ]= | USR |
|---|---|---|
| I10 Cur KSA Lev 1  Count 2    Cur KSA 4    No. of Supporting KSAS 0 ||| 
| KSA Type  S   KSA Generation Mode A    Proficiency Objective Level SPO |||
| KSA NAME Perform Initial Power Up Procedures |||
| KSA Verb PERFORM |||

| [ SPECIFY TEST AND TEST MEDIA ] || ADM |
|---|---|---|
| MEDIA TYPE | =[ LINK STANDARDS ]= | USR |

| L | Standard Name | Description |
|---|---|---|
|   | CAI | COMPUTER AIDED INSTRUCTION |
|   | CBT | COMPUTER BASED INSTRUCTION |
|   | FFS | FULL FLIGHT SIMULATOR |
| X | FTD | FLIGHT TRAINING DEVICE |
| X | PTT | PART TASK TRAINER |

Appendix J

```
J1                    =[ DEFINE CURRICULUM ]=

Name 767-300 Initial Qualification
Description
       Type TRANSITION                 Jobs 2   Aircraft 3   Entry Pops 2

Element Type         Description
SUBTASK              PERFORM INITIAL POWER UP PROCEDURES
SUB-OPERATION        SET CABIN PRESSURE
SUB-OPERATION        SET HYDRAULIC PUMPS
SUB-OPERATION        SET AC BUS
SUB-OPERATION        SET DC BUS         ┌─────────────────────────────────┐
SUB-OPERATION        START APU          │ List the subjects to be trained.│
SUBTASK              PERFORM EXTERIOR PREFLIGHT PROCEDURES
SUBTASK              PERFORM INTERIOR PREFLIGHT PROCEDURES
OPERATION            COCKPIT PREFLIGHT CHECKLIST
SUBTASK              PERFORM PUSHBACK/START OPERATIONS
OPERATION            START ENGINES
```

```
J2                 =[ TREATMENT REQUIREMENTS ANALYSIS ]=              USR

Seq# 9   Name/Title INITIAL POWERUP                        Required Y

Verb LIST            Object POWERUP PROCED Pred Obj STEPS

Behavior   List the steps of the initial powerup procedure.
Conditions You will be provided an operations manual and a computer terminal
Standards  No residual errors.

Taxonomy Recog. Fact   Instr Type Presentation  Strategy Prompt

Pace SELF          PPF GEN. PRACTICE Time 15 min.        Media

Design Specs Interactive with immediate Cont Caps This procedure is used whe

┌──────────────────────────────────────┐
                  │ Specify Instructional Treatments     │
                  └──────────────────────────────────────┘

─Copyright 1992 TRACE TECHNOLOGIES, INC.─
```

```
┌──────────────────────────┐
│ Select candidate media.  │MENT REQUIREMENTS ANALYSIS ]=            USR
└──────────────────────────┘
J3
Seq# 9   Name/Title INITIAL POWERUP                        Required Y Verb LIST            Object POWERUP PROCED Pred Obj STEPS Behavior   List the steps of the initial powerup procedure.
Conditions You will be provided an operations manual and a computer terminal
Standards  No residual errors.

Taxonomy Recog. Fact   Instr Type Presentation  Strategy Prompt
```

| MEDIA TYPE | =[ LINK STANDARDS ]= | USR |
|---|---|---|
| S | Standard Name | Description |
|   | CAI | COMPUTER AIDED INSTRUCTION |
| X | CBT | COMPUTER BASED INSTRUCTION |
|   | FFS | FULL FLIGHT SIMULATOR |
|   | FTD | FLIGHT TRAINING DEVICE |
|   | PTT | PART TASK TRAINER |

```
┌─────────────────────────────────────────────────────────────────────────────┐
│ J4                  =[ TREATMENT REQUIREMENTS ANALYSIS ]=              USR  │
├─────────────────────────────────────────────────────────────────────────────┤
│ Seq# 9   Name/Title INITIAL POWERUP                       Required Y        │
│                                                                             │
│ Verb LIST            Object POWERUP PROCED Pred Obj STEPS                   │
│                                                                             │
│ Behavior   List the steps of the initial powerup procedure.                 │
│ Conditions You will be provided an operations manual and a computer terminal│
│ Standards  No residual errors.                                              │
│                                                                             │
│ Taxonomy Recog. Fact   Instr Type Presentation   Strategy Prompt            │
│                                                                             │
│ Pace SELF          PPF GEN. PRACTICE Time 15 min.        Media CBT          │
│                                                                             │
│ Design Specs Interactive with immediate Cont Caps This procedure is used whe│
│                                                                             │
│                                                                             │
│                                       ─Copyright 1992 TRACE TECHNOLOGIES, INC.─│
└─────────────────────────────────────────────────────────────────────────────┘
```

```
┌─────────────────────────────────────────────────────────────────────────────┐
│ J5                         =[ DEFINE CURRICULUM ]=                          │
├─────────────────────────────────────────────────────────────────────────────┤
│        Name 767-300 Initial Qualification                                   │
│ Description                                                                 │
│        Type QUALIFICATION            Jobs 2   Aircraft 3   Entry Pops 2     │
│ ───────────────────────────[ DEFINE SYLLABUS ]───────────────────────────── │
│                                                                             │
│   Syllabus 767-300 I/Q Captain            Record 1/7    Entry Pops 1        │
│ Description                                                                 │
│            Level|      Name                                                 │
│                 ┼──────────────────                                         │
│              1  |SEGMENT                                                    │
│              2  |MODULE                    Specify instructional            │
│              3  |LESSON                       levels and names.             │
│              4  |LESSON ELEMENT                                             │
│                                                                             │
└─────────────────────────────────────────────────────────────────────────────┘
```

```
┌─────────────────────────────────────────────────────────────────────────────┐
│ J6                         =[ DEFINE CURRICULUM ]=                          │
├─────────────────────────────────────────────────────────────────────────────┤
│        Name 767-300 Initial Qualification                                   │
│ Description                                                                 │
│        Type QUALIFICATION            Jobs 2   Aircraft 3   Entry Pops 2     │
│ ───────────────────────────[ DEFINE SYLLABUS ]───────────────────────────── │
│                                                                             │
│   Syllabus 767-300 I/Q Captain            Record 1/7    Entry Pops 1        │
│ Description                                                                 │
│   Level Name     |Seq|    Name              |       Description             │
│ ─────────────────┼───┼──────────────────────┼─────────────────────────────  │
│  SEGMENT         | 1 |Preflight                                             │
│  MODULE          | 1 |Systems                                               │
│  LESSON          | 1 |Airconditioning                                       │
│  LESSON ELEMENT  | 1 |Introduction                                          │
│  LESSON ELEMENT  | 2 |Temperature                                           │
│  LESSON ELEMENT  | 3 |Pressure                                              │
│  LESSON ELEMENT  | 4 |Test                                                  │
│                                                                             │
└─────────────────────────────────────────────────────────────────────────────┘
```

Appendix K

```
┌─────────────────────────────┬──────────────────────────────────────────────┐
│ Select candidate media.     │ NOWLEDGES, SKILLS AND ATTITUDES ]=  K1   USR │
├─────────────────────────────┴──────────────────────────────────────────────┤
│   Cur KSA Lev  1  Count 2    Cur KSA 4     No. of Supporting KSAS 0        │
│     KSA Type  S  KSA Generation Mode A   Proficiency Objective Level SPO   │
│     KSA NAME Perform Initial Power Up Procedures                           │
│     KSA Verb PERFORM                                                       │
├────────────────────────────────────────────────────────────────────────────┤
│              [ SPECIFY TEST AND TEST MEDIA ]                          ADM  │
│  MEDIA TYPE              =[ LINK STANDARDS ]=                         USR  │
│ L│      Standard Name          │            Description                   │
│  │ CAI                         │ COMPUTER AIDED INSTRUCTION                │
│  │ CBT                         │ COMPUTER BASED INSTRUCTION                │
│ X│ FFS                         │ FULL FLIGHT SIMULATOR                     │
│ X│ FTD                         │ FLIGHT TRAINING DEVICE                    │
│ X│ PTT                         │ PART TASK TRAINER                         │
└────────────────────────────────────────────────────────────────────────────┘
```

K2

OCTOBER 16, 1992    BOEING 757 CONTROLS - FINAL STATES        Page:   1

| ATA CODE | SYSTEM EQUIPMENT CONTROL | ID NO. | FINAL STATE |
|---|---|---|---|
| 21.30.2 | Flight Altitude Selector | 1829 | PUSHED AND ROTATED |
|  |  | 1674 | BACKCOURSE |
|  |  | 1684 | CUTOFF |
|  |  | 1728 | LANDING |
|  |  | 1669 | AUTO |
|  |  | 1709 | FUEL |
| 21.30.3 | Landing Altitude Selector | 1830 | OUTER KNOB |
|  |  | 1831 | INNER KNOB |
| 21.30.9 | Flight/Ground Switch | 1834 | GRD |
|  |  | 1835 | FLT |
| 21.30.11 | Cabin Rate Selector | 1725 | INDEX MARK |
|  |  | 1840 | DECR |
|  |  | 1841 | INCR |
| 21.30.13 | Cabin Altitude Selector | 1830 | OUTER KNOB |
|  |  | 1831 | INNER KNOB |

> Media performance requirements;
> PTT control positions.

OCTOBER 16, 1992    BOEING 757 INDICATORS - FINAL STATES      Page:   1

| ATA CODE | SYSTEM EQUIPMENT INDICATOR | ID NO. | FINAL STATE |
|---|---|---|---|
| 21.30.1 | Flight Altitude Indicator | 1843 | ILLUMINATED (AMBER) |
| 21.30.5 | Auto Fail Light | 1843 | ILLUMINATED (AMBER) |
| 21.30.6 | Off Schedule Descent Light | 1843 | ILLUMINATED (AMBER) |
|  |  | 1845 | EXTINGUISHED |
| 21.30.7 | Standby Light | 1844 | ILLUMINATED (GREEN) |
| 21.30.8 | Manual Light | 1844 | ILLUMINATED (GREEN) |
| 21.30.12 | Cabin Altitude Indicator | 1846 | READOUT |
| 21.30.14 | Outflow Valve Position Indicator | 1847 | OPEN |
|  |  | 1848 | CLOSE |
|  |  | 1849 | INTERMEDIATE |

> Media performance requirements;
> PTT indicator indications.

```
ACFT B767-300  K3        =[ ANALYZE SYSTEM STRUCTURES ]=              USR
```

| Number   | Typ | Name                           | Part   | Rev. |
|----------|-----|--------------------------------|--------|------|
| 21       | SYS | AIR CONDITIONING/PRESSURIZATION | CA-234 | 19   |
| 21.20    | SUB | Distribution                   | CA-119 | 0    |
| 21.30    | SUB | Pressurization                 | CA-120 | 7    |
| 21.30.1  | IND | Flight Altitude Indicator      | 700641 | 0    |
| 21.30.2  | CON | Flight Altitude Selector       | 700222 | 4    |
| 21.30.3  | CON | Landing Altitude Selector      | 700412 | 4    |
| 21.30.4  | IND | Auto Fail Light                | 700912 | 0    |
| 21.30.5  | IND | Off Schedule Descent Light     | 700117 | 3    |
| 21.30.6  | IND | Standby Light                  | 700663 | 8    |
| 21.30.7  | IND | Manual Light                   | 700913 | 0    |

Media performance requirements;
PTT control and indicator manufacturer drawing numbers.

—Copyright 1992 TRACE TECHNOLOGIES, INC.—

```
ACFT B767-300   K4       =[ DEFINE CONTROLS ]=                        USR
```

| S | Number   | Typ | Name                      | Part   | Rev. |
|---|----------|-----|---------------------------|--------|------|
| X | 21.30.2  | CON | Flight Altitude Selector  | 700222 | 4    |
|   | 21.30.3  | CON | Landing Altitude Selector | 700412 | 4    |

Media performance requirements;
PTT control functional definition.

Type      KNOB
Location  Pressurization Panel - Overhead Panel          Record 1/1
Purpose   Sets cabin cruise altitude.
―――――――――――――――――――――[ POSITIONS ]―――――――――――――――――
Position  PUSHED AND ROTATED                             Record 4/6
Function  Selects cabin cruise altitude.

—Copyright 1992 TRACE TECHNOLOGIES, INC.—

Appendix L

```
ACFT B767-200   L1            =[ ANALYZE TASK STRUCTURE ]=                        USR
┌─────────────────┬──────────┬──────────────────────────────────────────────────┐
│     Number      │   Type   │                  Description                     │
├─────────────────┼──────────┼──────────────────────────────────────────────────┤
│ 1.2             │ NORMAL   │ Perform Flight Planning Operations               │
│ 1.2.1           │ NORMAL   │ Assess Environmental Factors                     │
│ 1.2.2           │ NORMAL   │ Perform Dispatch Duties                          │
│ 1.2.3           │ NORMAL   │ Review/Assess Aircraft Maintenance Status        │
│ 1.2.4           │ NORMAL   │ Review/Assess Operational Factors                │
│ 1.2.5           │ NORMAL   │ Perform Communications                           │
│                 │          │                                                  │
│     ┌───────────────────────────────────────────────────────────────┐         │
│     │ This screen is displaying the hierarchal structure for        │         │
│     │ number 1.2.                                                   │         │
│     │ Press ALT-9 to initiate the process structuring program.      │         │
│     └───────────────────────────────────────────────────────────────┘         │
│                 │          │                                                  │
│                 │          │                                                  │
│                 │          │                                                  │
│                 │          │                     Copyright 1992 TRACE TECHNOLOGIES, INC. │
└─────────────────┴──────────┴──────────────────────────────────────────────────┘
```

```
L2─────────────────────────────────────────────────────────────────────────────
....|....1....|....2....|....3....|....4....|....5....|....6....|....7....|....|
.NS
   1.2  {2} Perform Flight Planning Operations
      1.2.1  {3} Assess Environmental Factors
      1.2.2  {4} Perform Dispatch Duties
      1.2.3  {5} Review/Assess Aircraft Maintenance Status
      1.2.4  {6} Review/Assess Operational Factors
      1.2.5  {7} Perform Communications
[EOB]

┌──────────────────────────────────────────────────────────────────┐
   │ The portion of the structure that was selected is now residing in│
   │ the full-screen editor.  We will demonstrate the capability to   │
   │ add a new element to the structure.                              │
   │═════════════════════════[ Press any Key ]════════════════════════│
   └──────────────────────────────────────────────────────────────────┘

Buffer: MAIN       File: reload.key             |Insert   |Adv   |[1,1]

L3─────────────────────────────────────────────────────────────────────────────
....|....1....|....2....|....3....|....4....|....5....|....6....|....7....|....|
.NS
   1.2  {2} Perform Flight Planning Operations
      1.2.1  {3} Assess Environmental Factors
      1.2.2  {4} Perform Dispatch Duties
      1.2.3  {5} Review/Assess Aircraft Maintenance Status
      1.2.3      THIS IS A TEST
      1.2.4  {6} Review/Assess Operational Factors
      1.2.5  {7} Perform Communications
[EOB]

┌──────────────────────────────────────────────────────────────────┐
   │ Now that the new element has been added, press the F10 key to   │
   │ execute the process structure program.                           │
   └──────────────────────────────────────────────────────────────────┘

Buffer: MAIN       File: reload.key             |Insert   |Adv   |[1,1]
```

L4

```
The edited structure file contains 1 warning(s).

These warnings are usually indicating where you have made changes
to structure numbers. Please review the file to make sure your
changes are OK.

You must determine if you are satisfied that there are no errors.
Enter Y if you wish the program to process the structure or N to
review/edit the warnings or enter Q to exit: N
```

```
This summary is informing you that your structure contains a warning.
If the warning is understood, you would answer Y to proceed.  For the
purpose of demonstration, press the N key so that you may investigate
the warning message.
```

L5
```
....|....1....|....2....|....3....|....4....|....5....|....6....|....7....|....|
    1.2   {2}  Perform Flight Planning Operations
        1.2.1   {3} Assess Environmental Factors
        1.2.2   {4} Perform Dispatch Duties
        1.2.3   {5} Review/Assess Aircraft Maintenance Status
% ================================================================
% WARNING: Duplicate number "3" in sequence at level 3 not allowed.
%          "4" will be assigned to level 3.
% ================================================================
        1.2.3   THIS IS A TEST
        1.2.4   {6} Review/Assess Operational Factors
        1.2.5   {7} Perform Communications
[EOB]
```

```
You are back in the full-screen editor.  Observe that there is a
warning message directly above the new line.  The message indicates
that there is a duplicate number at level 3.  Press the F10 key to
exit the editor and re-execute the process structure program.
```

Buffer: MAIN       File: reload.key              |Insert   |Adv   |[1,1]

M6

```
The edited structure file contains 1 warning(s).

These warnings are usually indicating where you have made changes
to structure numbers. Please review the file to make sure your
changes are OK.

You must determine if you are satisfied that there are no errors.
Enter Y if you wish the program to process the structure or N to
review/edit the warnings or enter Q to exit: Y
```

```
Now that we are satisfied that the warning is correct, press the Y key
to permit the structure program to re-structure the elements.
```

```
 ACFT B767-200    L7           =[ ANALYZE TASK STRUCTURE ]=                    USR
```

| Number | Type   | Description                              |
|--------|--------|------------------------------------------|
| 1.2    | NORMAL | Perform Flight Planning Operations       |
| 1.2.1  | NORMAL | Assess Environmental Factors             |
| 1.2.2  | NORMAL | Perform Dispatch Duties                  |
| 1.2.3  | NORMAL | Review/Assess Aircraft Maintenance Status |
| 1.2.4  | -------- | THIS IS A TEST                         |
| 1.2.5  | NORMAL | Review/Assess Operational Factors        |
| 1.2.6  | NORMAL | Perform Communications                   |

```
    Observe that the new element has been committed and integrated at
    the proper level.  All links to related database objects have been
    maintained.
    ==========[ Press any key to Exit this Demonstration ]==========

Copyright 1992 TRACE TECHNOLOGIES, INC.
Press F9 to select a task type.
Count: 7                                                      <List><Replace>
``` asb:C:\WP51\WDATA\CASES\438_3550.APP

What is claimed is:

1. An information management system, comprising:

at least one computer;

a relational database stored in a memory that is accessible to said computer, said relational database comprising a relational database kernel, a plurality of information entities, each said information entity being comprised by a respective one of a plurality of entity tables, and a linker table for holding a plurality of many-to-many relationships among said information entities;

computer-implemented entity relation management program means, for manipulating data in said linker table to dynamically define many-to-many relationships among said information entities, such that many-to-many relationships in the relational database can be created and modified by a user to manage the relational database without structurally changing the relational database by one of creating and deleting tables thereof; and computer-implemented report generating program means, cooperating with said relational database kernel, for producing a coherent report that is informative of said relational database.

2. The system according to claim 1, further comprising computer-implemented hierarchal structure management program means, for dynamically defining hierarchal relationships among said information entities; said hierarchal relationships being compatible with operation of said relational database kernel.

3. The system according to claim 1, further comprising computer-implemented editor program means, for introducing and modifying data in said relational database and for instructing said relational database kernel.

4. The system according to claim 1, further comprising computer-implemented load/unload program means, for changing information between a first state that is intelligible to a human operator of said editor program means, and a second state having a format compatible with operation of said relational database kernel, an output of said load/unload program means being stored in said memory, such that a human operator can conveniently interact with said relational database.

5. The system according to claim 1, wherein said entity relation management program means associates parametric data with said information entities.

6. The system according to claim 1, further comprising a table having information that is generically descriptive of relational databases that can be managed by said system.

7. An information management system to ensure that humans perform to required standards while undertaking critical tasks in a complex environment, comprising:

at least one computer;

a relational database stored in a memory that is accessible to said computer, said relational database comprising a relational database kernel, a table having information that is generically descriptive of an enterprise that can be managed by said system, a plurality of information entities, each said information entity being comprised by a respective one of a plurality of entity tables, and a linker table for holding a plurality of many-to-many relationships among said information entities;

computer-implemented entity relation management program means, for manipulating data in said linker table to dynamically define many-to-many relationships among said information entities;

computer-implemented associated with said entity relation management program means, for associating parametric data with said information entities;

computer-implemented hierarchal structure management program means, for dynamically defining hierarchal relationships among said information entities; said hierarchal relationships being compatible with operation of said relational database kernel;

computer-implemented editor program means, for introducing and modifying data in said relational database and for instructing said relational database kernel;

computer-implemented load/unload program means, for changing information between a first state that is intelligible to a human operator of said editor program means, and a second state having a format compatible with said operation of said relational database kernel, an output of said load/unload program means being stored in said memory; and computer-implemented report generating program means, cooperating with said relational database kernel, for producing a coherent report that is informative of said enterprise;

such that many-to-many relationships in the relational database can be created and modified by a user to manage the enterprise without structurally changing the relational database by one of creating and deleting tables of the relational database.

* * * * *